(12) United States Patent
Asakura et al.

(10) Patent No.: US 12,375,010 B2
(45) Date of Patent: Jul. 29, 2025

(54) POWER CONVERSION DEVICE, AIRCRAFT, AND POWER CONVERSION METHOD

(71) Applicant: Mitsubishi Electric Corporation, Tokyo (JP)

(72) Inventors: Ryota Asakura, Tokyo (JP); Yusuke Shirouchi, Tokyo (JP); Kenji Fujiwara, Tokyo (JP); Tetsuya Kojima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 32 days.

(21) Appl. No.: 18/574,755

(22) PCT Filed: Jul. 7, 2021

(86) PCT No.: PCT/JP2021/025656
§ 371 (c)(1),
(2) Date: Dec. 28, 2023

(87) PCT Pub. No.: WO2023/281668
PCT Pub. Date: Jan. 12, 2023

(65) Prior Publication Data
US 2024/0396471 A1    Nov. 28, 2024

(51) Int. Cl.
*B64D 1/00* (2006.01)
*B64D 41/00* (2006.01)
(Continued)

(52) U.S. Cl.
CPC ............ *H02M 7/537* (2013.01); *B64D 41/00* (2013.01); *H02M 1/08* (2013.01); *H02M 1/32* (2013.01)

(58) Field of Classification Search
CPC .......... H02M 7/537; H02M 1/08; H02M 1/32; H02M 1/0029; H02M 7/4833;
(Continued)

(56) References Cited

U.S. PATENT DOCUMENTS 6,064,579 A * 5/2000 Copple ............. H02M 3/33507
363/17
10,381,932 B1   8/2019 Wang et al.
(Continued)

FOREIGN PATENT DOCUMENTS

| JP | 2011-142740 A | 7/2011 |
| JP | 5645209 | * 12/2014 |
| WO | 2017/037916 A1 | 3/2017 |

OTHER PUBLICATIONS

Extended European Search Report issued Sep. 10, 2024 in European Patent Application No. 21949302.0.
(Continued)

*Primary Examiner* — Rexford N Barnie
*Assistant Examiner* — Xuan Ly
(74) *Attorney, Agent, or Firm* — XSENSUS LLP

(57) ABSTRACT

A gradationally controlled voltage inverter, which is a power conversion device, controls a gate impedance of a main inverter before a capacitor voltage VDCS of a sub-inverter is controlled at a predetermined voltage so as to be larger than a gate impedance of the main inverter after the capacitor voltage VDCS of the sub-inverter is controlled at the predetermined voltage. This reduces the noise caused by the main inverter when the capacitor voltage VDCS of the sub-inverter is not controlled at the predetermined voltage.

13 Claims, 19 Drawing Sheets

(51) Int. Cl.
  *H02M 1/08*   (2006.01)
  *H02M 1/32*   (2007.01)
  *H02M 7/537*  (2006.01)

(58) Field of Classification Search
  CPC .. H02M 1/0095; H02M 7/4835; H02M 7/487; B64D 41/00
  USPC ......................................................... 307/9.1
  See application file for complete search history.

(56) References Cited

U.S. PATENT DOCUMENTS

2019/0006934 A1    1/2019   Nakashima et al.
2024/0326609 A1*  10/2024   Hadjidj ................ B64D 27/026

OTHER PUBLICATIONS

International Search Report and Written Opinion mailed on Oct. 5, 2021, received for PCT Application PCT/JP2021/025656, filed on Jul. 7, 2021, 8 pages including English Translation.

* cited by examiner

POWER CONVERSION DEVICE, AIRCRAFT, AND POWER CONVERSION METHOD

CROSS-REFERENCE TO RELATED APPLICATION

This application is a national stage application filed under 35 U.S.C. § 371 based on International Patent Application No. PCT/JP2021/025656, filed Jul. 7, 2021, the entire contents of which are incorporated herein by reference.

TECHNICAL FIELD

The present disclosure relates to a power conversion device, an aircraft with the power conversion device, and a power conversion method.

BACKGROUND ART

An inverter, which is a type of power conversion device, generates noise when switching. As a technology for reducing noise, a gradationally controlled voltage inverter is known, in which a sub-inverter is connected to a main inverter in series. The gradationally controlled voltage inverter includes a capacitor in the sub-inverter and controls the capacitor of the sub-inverter at a predetermined voltage. In addition, the sub-inverter includes an initial charging circuit configured of current limiting resistors and switches, etc., to suppress excess current during initial charging of the capacitor. The gradationally controlled voltage inverter performs gradational operation by adding or subtracting an output voltage of the sub-inverter to or from an output voltage of the main inverter. This allows the gradationally controlled voltage inverter to reduce switching frequency more than a typical inverter consisting of only the main inverter. Therefore, the gradationally controlled voltage inverter can reduce the noise.

As another example, Patent Document 1 discloses a gradationally controlled voltage inverter that does not include the initial charging circuit for the capacitor of the sub-inverter. A gradationally controlled voltage inverter according to Patent Document 1 controls a pulse width and a pulse cycle of a pulse voltage outputted from the main inverter, thereby suppressing an inrush current flowing to the capacitor of the sub-inverter to initially charge the capacitor of the sub-inverter. This allows the capacitor of the sub-inverter to be initially charged without the initial charging circuit for the capacitor of the sub-inverter, which leads to the downsizing of the gradationally controlled voltage inverter.

PRIOR ART DOCUMENTS

Patent Documents

Patent Document 1
  Japanese Unexamined Patent Application Publication No. 2011-142740

SUMMARY OF THE INVENTION

Problems to be Solved by the Invention

However, in the case where the capacitor of the sub-inverter is not controlled at the predetermined voltage, such as during start-up, the gradationally controlled voltage inverter according to Patent Document 1 allows the main inverter to start switching. In this case, the gradationally controlled voltage inverter applies a large amount of voltage change due to the main inverter to the load, thus causing a large amount of noise.

The present disclosure is made to solve the problems described above and to provide a power conversion device, which is a gradationally controlled voltage inverter without the initial charging circuit for the capacitor of the sub-inverter and capable of reducing the noise caused by the main inverter when the capacitor of the sub-inverter is not controlled at a predetermined voltage, an aircraft with the power conversion device, and a power conversion method used for the power conversion device.

Means for Solving Problem

A power conversion device according to the present disclosure includes: a main inverter connected to a power source side, the main inverter having a gate drive circuit capable of changing a gate impedance; a sub-inverter connected in series to the main inverter on a load side, the sub-inverter having a capacitor; a voltage detection means to detect a capacitor voltage of the sub-inverter; a control unit to control the capacitor voltage of the sub-inverter detected by the voltage detection means at a predetermined voltage, and to control the gate impedance of the main inverter before the capacitor voltage of the sub-inverter is controlled at the predetermined voltage so as to be larger than the gate impedance of the main inverter after the capacitor voltage of the sub-inverter is controlled at the predetermined voltage.

A power conversion method according to the present disclosure uses a main inverter connected to a power source side, the main inverter having a gate drive circuit capable of changing a gate impedance, and a sub-inverter connected in series to the main inverter on a load side, the sub-inverter having a capacitor, and includes: a step of detecting a capacitor voltage of the sub-inverter and controlling the detected capacitor voltage of the sub-inverter at a predetermined voltage; and a step of controlling the gate impedance of the main inverter before the capacitor voltage of the sub-inverter is controlled at the predetermined voltage so as to be larger than the gate impedance of the main inverter after the capacitor voltage of the sub-inverter is controlled at the predetermined voltage.

Effects of the Invention

According to the present disclosure, it is possible to reduce the noise caused by the main inverter when the capacitor of the sub-inverter is not controlled at a predetermined voltage.

EMBODIMENTS FOR CARRYING OUT THE INVENTION

Embodiment 1

Figure 1:
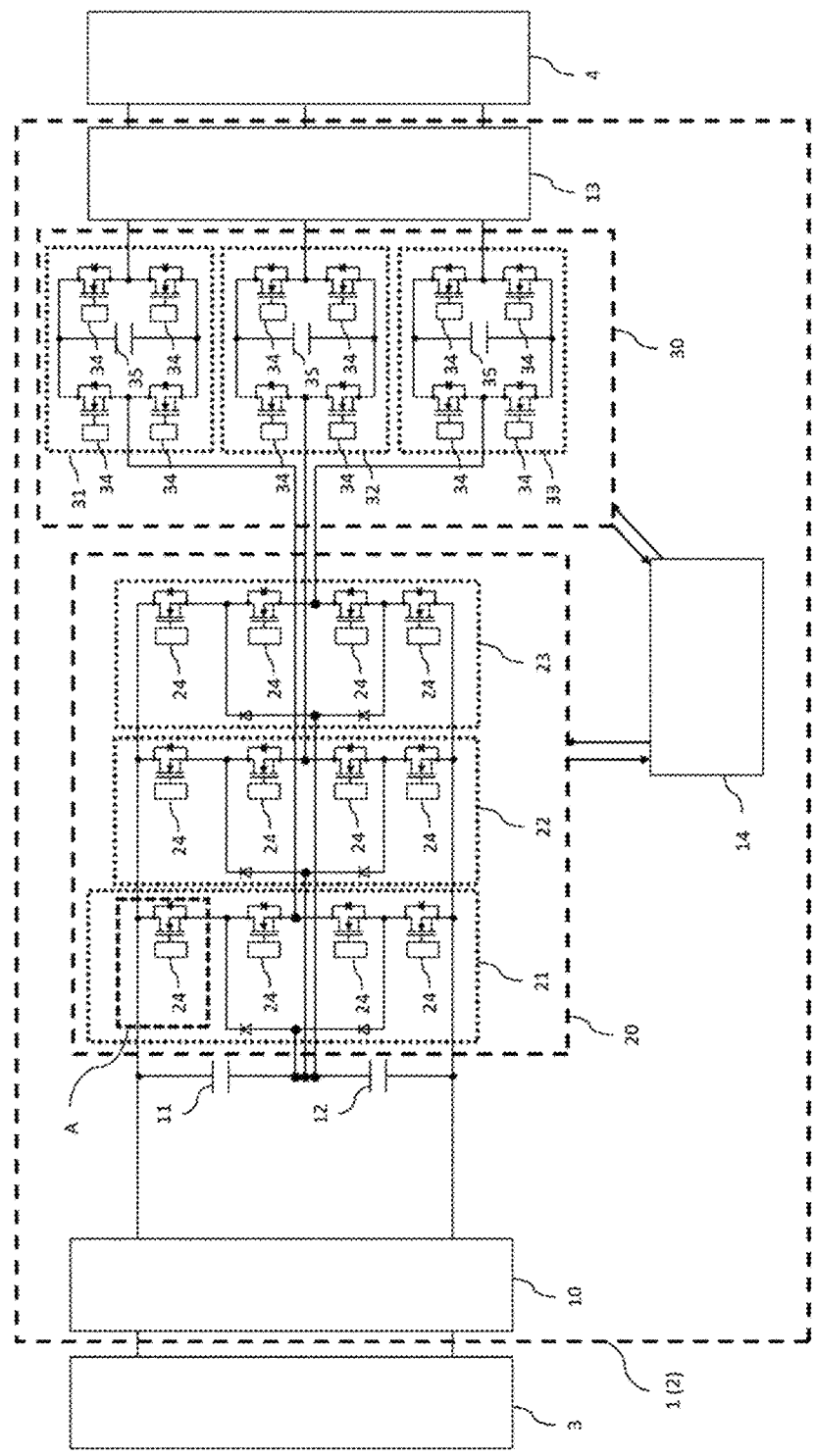
FIG. 1 is a circuit diagram showing a configuration of a power conversion device according to Embodiment 1.

A gradationally controlled voltage inverter 2, which is a power conversion device 1 according to Embodiment 1, will be described with reference to FIG. 1. FIG. 1 is a circuit diagram showing a configuration of the gradationally controlled voltage inverter 2 according to Embodiment 1. In the example described below, the power conversion device 1 according to the present embodiment is the gradationally controlled voltage inverter 2 of DC/AC type that converts DC power from a first DC power source 3, which is a direct current power source, into AC power required to drive a load 4. The gradationally controlled voltage inverter 2 is connected between the first DC power source 3 and the load 4.

Although the first DC power source 3 is described as an example of supplying DC power through DC wiring, it may be a separate system such as a DC power source system or a solar battery. In the case where the first DC power source 3 supplies DC power through the DC wiring, a DC/DC power conversion device and an AC/DC power conversion device capable of step-up, step-down, or both step-up and step-down may be provided on the DC wiring side to supply DC voltage. Also, a DC/DC power conversion device may be provided between the first DC power source 3 and the power conversion device 1.

The load 4 is a load configured of at least one of passive components such as a resistor, an inductor, and a capacitor. Instead, the load 4 may be an electric motor or the like.

The gradationally controlled voltage inverter 2 includes an input noise filter 10, two series capacitors 11 and 12, a main inverter 20, a sub-inverter 30, an output noise filter 13, and a control unit 14. Each configuration of the gradationally controlled voltage inverter 2 will be described below.

The main inverter 20 is connected on the side closer to the first DC power source 3, which is the DC power source, than the sub-inverter 30. In the present embodiment, the case where the main inverter 20 is a three-phase three-level inverter will be described as an example. The main inverter 20 is not limited to a three-phase inverter, but may be, for example, a single phase inverter or an inverter with multiple output phases other than three phases. Also, the main inverter 20 is not limited to a three-level inverter, but may be an inverter with a number of output levels other than three, as long as it is a multi-level inverter.

The main inverter 20, which is a three-phase inverter, is configured to have three output phases 21, 22, and 23 corresponding to a U-phase main inverter arm 21, a V-phase main inverter arm 22, and a W-phase main inverter arm 23, respectively. The main inverter 20 includes four semiconductor switches such as IGBTs and MOSFETs with switching capability, two diodes with rectifying capability, and gate drive circuits 24, in each of the output phases 21, 22, and 23. IGBTs and MOSFETs, etc. may be used instead of the diodes. The gate drive circuits 24 can change the gate impedance of circuit elements of the gate drive circuits 24. The gate drive circuits 24 will be described later.

The main inverter 20, which is a three-level inverter, is connected to the midpoint of the two series capacitors 11 and 12, which divide a voltage of the first DC power source 3. As shown in FIG. 1, the DC bus voltage value of the main inverter 20, which is the voltage of the first DC power source 3, is referred to as VDCM. Also, of the two series capacitors 11 and 12, the capacitor on the high potential side and its voltage value are referred to as a P-bus capacitor 11 and VDCMP, respectively; the capacitor on the low potential side and its voltage value are referred to as an N-bus capacitor 12 and VDCMN, respectively. The semiconductor switches of the main inverter 20 are each driven and controlled by the control unit 14, so that the main inverter 20 outputs one of the voltage VDCMP of the P-bus capacitor 11, the voltage VDCMN of the N-bus capacitor 12, and the voltage of a neutral point, which is a connection point of the P-bus capacitor 11 and the N-bus capacitor 12. FIG. 1 shows a diode-clamped three-level inverter as the main inverter 20. However, the main inverter 20 may be configured as a flying-capacitor type, or as a T-type three-level inverter using bidirectional switches.

The main inverter 20 includes a voltage detection means for detecting the voltage VDCMP of the P-bus capacitor 11 and the voltage VDCMN of the N-bus capacitor 12 of the main inverter 20. The voltage detection means, which may be a publicly known means, may detect by, for example, stepping-down an inter-terminal voltage with a resistor voltage-dividing circuit and receiving the stepped-down voltage with a differential amplifier circuit.

The sub-inverter 30 is a single-phase inverter with a capacitor 35 and is connected in series with the main inverter 20 on the side closer to the load 4 than the main inverter 20.

Specifically, the sub-inverter 30 is connected in series to each of the terminals of the U-phase main inverter arm 21, the V-phase main inverter arm 22, and the W-phase main inverter arm 23 of the main inverter 20. Inverters which are components of the sub-inverter 30, connected in series respectively with the output phases 21, 22, and 23 of the main inverter 20, are referred to as a U-phase sub-inverter 31, a V-phase sub-inverter 32, and a W-phase sub-inverter 33, respectively. The sub-inverter 30, which is a full bridge inverter, includes two semiconductor switches such as IGBT and MOSFET with switching capability for each bridge. The U-phase sub-inverter 31, the V-phase sub-inverter 32, and the W-phase sub-inverter 33 each include a capacitor 35 and gate drive circuits 34 capable of changing the gate impedance. The gate drive circuits 34 can change the gate impedance of circuit elements of the gate drive circuits 34. The gate drive circuit 34 will be described later.

The voltage values of the capacitor 35 of the U-phase sub-inverter 31, the V-phase sub-inverter 32, and the W-phase sub-inverter 33 are referred to as VDCSU, VDCSV, and VDCSW, respectively. The capacitor voltages VDCSU, VDCSV, and VDCSW of the respective output phases 31, 32, and 33 are collectively referred to as a capacitor voltage VDCS of the sub-inverter 30. The sub-inverter 30 includes a voltage detection means for detecting the capacitor voltage VDCS of the sub-inverter 30. The voltage detection means, which may be a publicly known means, may detect by, for example, stepping down an inter-terminal voltage with a resistor voltage dividing circuit and receiving the stepped-down voltage with a differential amplifier circuit. The capacitor voltage VDCS of the sub-inverter 30 is controlled by the control unit 14 at a predetermined voltage. The predetermined voltage is set lower than the voltage of the first DC power source 3, which is the DC bus voltage VDCM of the main inverter 20. In the present embodiment, an example will be described where the capacitor voltage VDCS of the sub-inverter 30 is ¼ of the voltage of the DC bus voltage VDCM of the main inverter 20. Note that the predetermined voltage should only be lower than the voltage of the first DC power source 3 and is not limited to ¼ voltage of the DC bus voltage VDCM of the main inverter 20.

The semiconductor switches and the diodes described above may be configured with Si semiconductors, and at least one of the semiconductor switches and the diodes may be configured with a wide bandgap semiconductor such as SiC and GaN. The wide bandgap semiconductors can make the loss smaller than the Si semiconductors.

In order to change the switching speed of each semiconductor switch, the main inverter 20 includes the gate drive circuit 24 with a gate impedance changing means in each of the semiconductor switches in each of the output phases 21, 22, and 23. Similarly, in order to change the switching speed of each semiconductor switch, the sub-inverter 30 includes the gate drive circuit 34 with the gate impedance changing means in each of the semiconductor switches in each of the output phases 31, 32, and 33.

Figure 2:
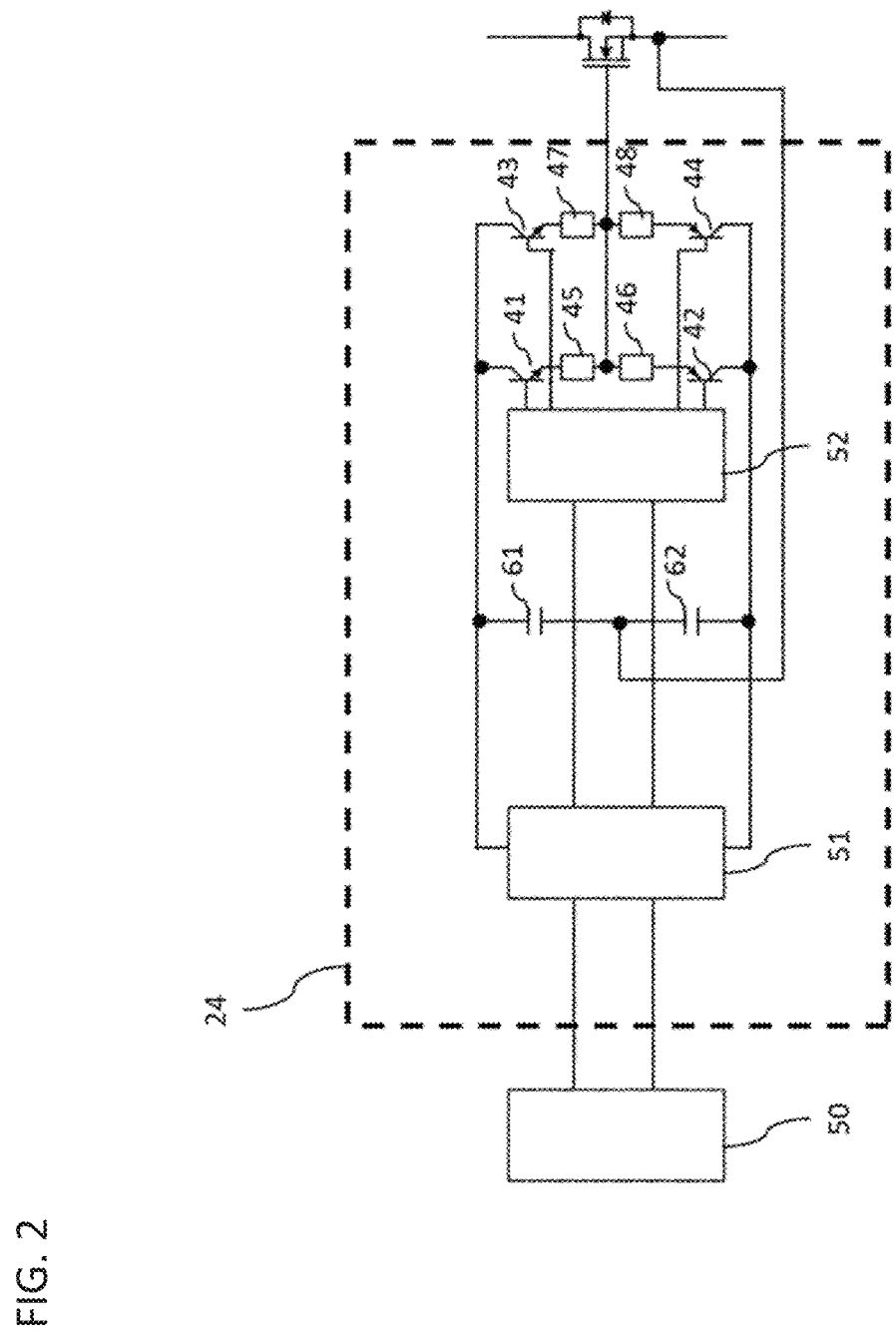
FIG. 2 is a circuit diagram showing a gate drive circuit with a gate impedance changing means included in a main inverter according to Embodiment 1.

FIG. 2 is a circuit diagram showing the gate drive circuit 24 with the gate impedance changing means included in the main inverter 20 according to Embodiment 1. FIG. 2 shows the gate drive circuit 24 driving the semiconductor switch of the U-phase main inverter arm 21 shown by A in FIG. 1. The following description is given using the gate drive circuit 24 shown in FIG. 2 as an example. The other semiconductor switches and the gate drive circuits 24 and 34 connected to the semiconductor switches have the same circuit configuration.

The gate drive circuit 24 includes four transistors 41, 42, 43, and 44 that are bridge-connected. A transistor 41 and a transistor 42 are connected in series via two circuit elements, or impedance components 45 and 46. A transistor 43 and a transistor 44 are connected in series via two circuit elements, or impedance components 47 and 48. The connection point of the impedance components 45 and 46, which are circuit elements, and the connection point of the impedance components 47 and 48, which are circuit elements, are wire-connected, and the output end is wire-connected to the gate of the semiconductor switch. An output part of the gate drive circuit 24 is configured as a totem pole circuit (also called as a push-pull circuit) such that the number of parallels of the gate impedance can be changed by the number of parallels of the totem pole circuit. The gate impedance of each circuit element is generally configured using gate resistors, but may also be configured using a combination of passive components such as a resistor and an inductor.

In addition, the gate drive circuit 24 includes a switching speed selecting unit 52 that switches the speed at which the semiconductor switch is driven. The switching speed selecting unit 52 is configured, for example, with a logic circuit.

The gate drive circuit 24 includes a second DC power source 61 and a third DC power source 62. The second DC power source 61 and the third DC power source 62 are connected to the transistors 41, 42, 43, and 44 and an insulation unit 51. The insulation unit 51 is a circuit that isolates the signal received from a signal generation unit 50, and a photocoupler or an isolation IC may be used for the insulation unit 51, for example.

The switching speed selecting unit 52 changes the parallel connection of the totem pole circuit and thus the magnitude of the gate impedance by controlling the on/off of transistors 41, 42, 43, and 44. By increasing the gate impedance, the semiconductor switch can decrease the switching speed. On the other hand, by decreasing the gate impedance, the semiconductor switch can increase the switching speed. In the present embodiment, a totem-pole-type gate impedance changing means is described. However, the configurations of the gate drive circuits are not limited to the configuration example of the gate drive circuit 24 described above, and the gate drive circuits 24 and 34 may be configured such that the gate impedance can be changed using another publicly known technology. In the above, the magnitude of the gate impedance is changed by the parallel connection. However, the same is possible with a series connection. For example, a configuration may be used in which a plurality of circuits are further added to increase the number of parallels or series therein and their connections are switched. The switching of the connections, in series or in parallel, to change the gate impedance, may be performed by high-speed relays, etc., instead of the semiconductor switches such as the transistors 41, 42, 43, and 44. In addition, the gate drive circuits 24 and 34 may be configured with a combination of diodes for the gate impedance.

Returning to FIG. 1, the input noise filter 10 is connected between the first DC power source 3 and the two series capacitors 11 and 12. The output noise filter 13 is connected between the sub-inverter 30 and the load 4. The input noise filter 10 and the output noise filter 13 are configured with at least one of a common mode filter and a normal mode filter to suppress noise and surge voltage, etc. The gradationally controlled voltage inverter 2 may include only one of the input noise filter 10 and the output noise filter 13 as measures for reducing components and measures against noise, etc.

The control unit 14 outputs control signals to the main inverter 20 and the sub-inverter 30. The control unit 14 includes a central processing unit (CPU), a digital signal processor (DSP), and a field-programmable gate array (FPGA), etc.

The control unit 14 controls the output voltages of the main inverter 20 and the sub-inverter 30 on the basis of the information of the voltage VDCMP of the P-bus capacitor 11 of the main inverter 20, the voltage VDCMN of the N-bus capacitor 12 of the main inverter 20, and the capacitor voltage VDCS of each phase of the sub-inverter 30 detected by the voltage detection means. Specifically, the control unit 14 controls the output voltages of the main inverter 20 and the sub-inverter 30 to bring a differential voltage between the voltage VDCMP of the P-bus capacitor 11 and the voltage VDCMN of the N-bus capacitor 12 of the main inverter 20 to zero and the capacitor voltage VDCS of the sub-inverter 30 to the predetermined voltage. Each voltage control performed by the control unit 14 is a PI control or the like, which brings the voltage detected by the voltage detection means closer to a target voltage to be outputted. Alternatively, the control unit 14 may detect a phase current of the gradationally controlled voltage inverter 2 and control the load current on the basis of the detected phase current. For example, the control unit 14 may control the current by detecting and dq-converting the phase current of the gradationally controlled voltage inverter 2 and by PI-controlling the dq-converted current. In addition, the control unit 14 controls the gate impedance changing means of the respective gate drive circuits 24 and 34 of the main inverter 20 and the sub-inverter 30. The description of the operation of the control unit 14 will be given in the description of the operation of the gradationally controlled voltage inverter 2, which will be given later.

Figure 3:
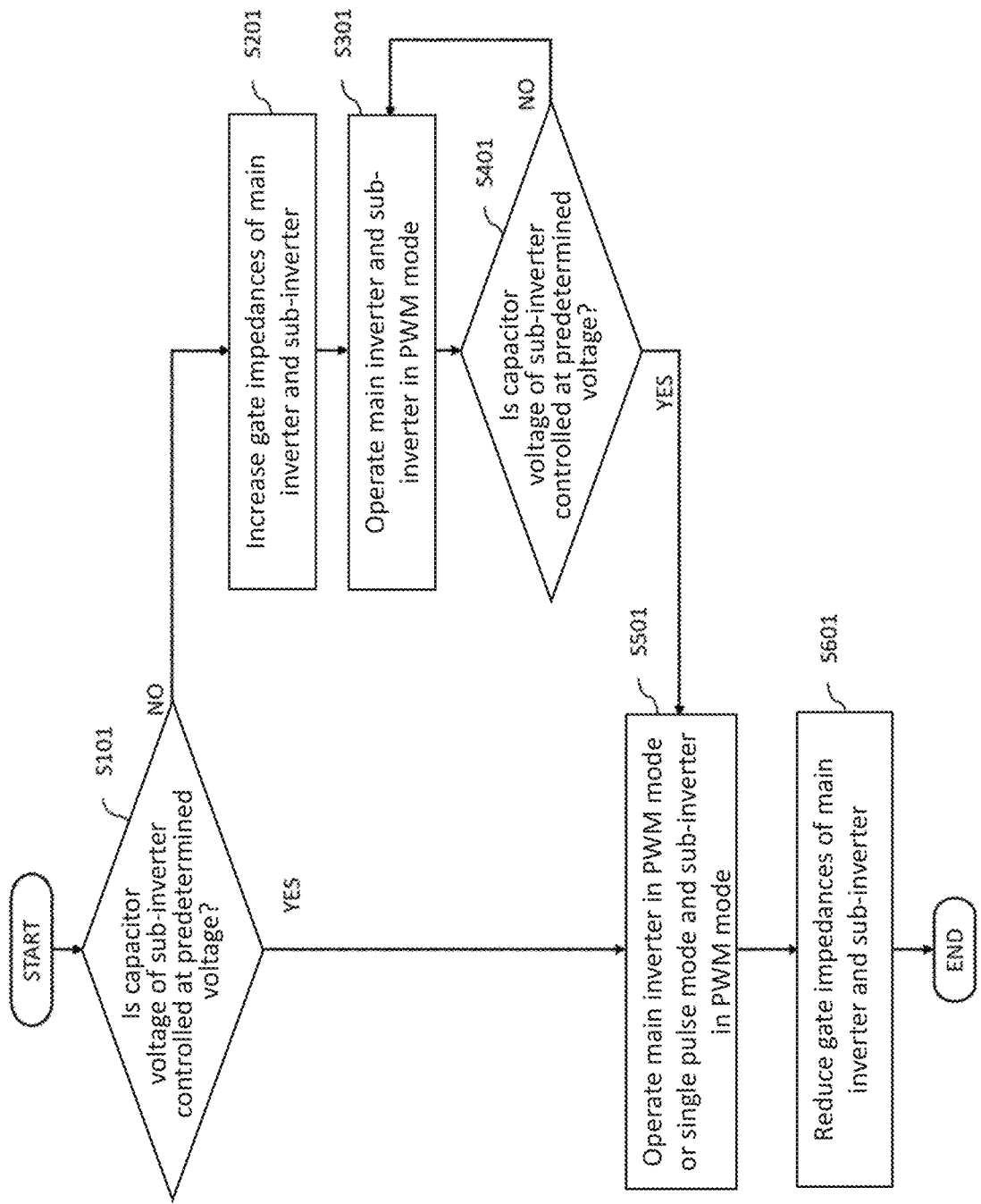
FIG. 3 is a flowchart showing an operation of a gradationally controlled voltage inverter according to Embodiment 1.

Next, the operation of the gradationally controlled voltage inverter 2, which is the power conversion device 1 according to the present embodiment, will be described. The gradationally controlled voltage inverter 2 performs gradational operation by adding or subtracting the output voltage of the sub-inverter 30 to or from the output voltage of the main inverter 20. Without being provided with an initial charging circuit for initially charging the capacitor voltage VDCS of the sub-inverter 30, the gradationally controlled voltage inverter 2 initially charges the capacitor voltage VDCS of the sub-inverter 30 and controls the capacitor voltage VDCS of the sub-inverter 30 at the predetermined voltage by switching the semiconductor switches of the main inverter 20 and the sub-inverter 30. FIG. 3 is a flowchart showing an operation of the gradationally controlled voltage inverter 2 according to Embodiment 1.

First, in step S101, the control unit 14 determines whether the capacitor voltage VDCS of the sub-inverter 30 detected by the voltage detection means of the sub-inverter 30 is controlled at the predetermined voltage.

In step S101, the case where the control unit 14 determines that the capacitor voltage VDCS of the sub-inverter 30 is not controlled at the predetermined voltage (NO in S101) will be described. For example, during start-up of the gradationally controlled voltage inverter 2, the capacitor voltage VDCS of the sub-inverter 30 is not controlled at the predetermined voltage because the capacitor voltage VDCS of the sub-inverter 30 is not initially charged.

In this case, the control unit 14 controls the gate impedance changing means of the gate drive circuits 24 and 34 to increase the gate impedances of the main inverter 20 and the sub-inverter 30 (S201). Here, increasing the gate impedances of the main inverter 20 and the sub-inverter 30 means causing the gate impedances of the main inverter 20 and the sub-inverter 30 to be larger than the gate impedances of the main inverter 20 and the sub-inverter 30 resulting after the capacitor voltage VDCS of the sub-inverter 30 is controlled at the predetermined voltage in step S601 to be described later. Details of step S201 will be described later.

Then, in step S301, the control unit 14 operates each of the main inverter 20 and the sub-inverter 30 in PWM (pulse width modulation) mode to output the target voltage. To distinguish the PWM operation here from a single pulse operation, which will be described later, it is assumed that the PWM operation involves multiple times of positive and negative switching in a cycle. More preferably, the control unit 14 controls the sub-inverter 30, whose capacitor voltage VDCS is low, to perform switching at a higher frequency than the main inverter 20. Although the loss increases, the control unit 14 may cause the main inverter 20 to switch at a frequency equal to or higher than that of the sub-inverter 30. Under the control of the control unit 14, the sub-inverter 30 outputs a difference between the target voltage of the gradationally controlled voltage inverter 2 and the output voltage of the main inverter 20.

Steps S201 and S301 may be performed simultaneously.

Here, step S301 will be described using FIGS. 4 to 6.

Figure 4:
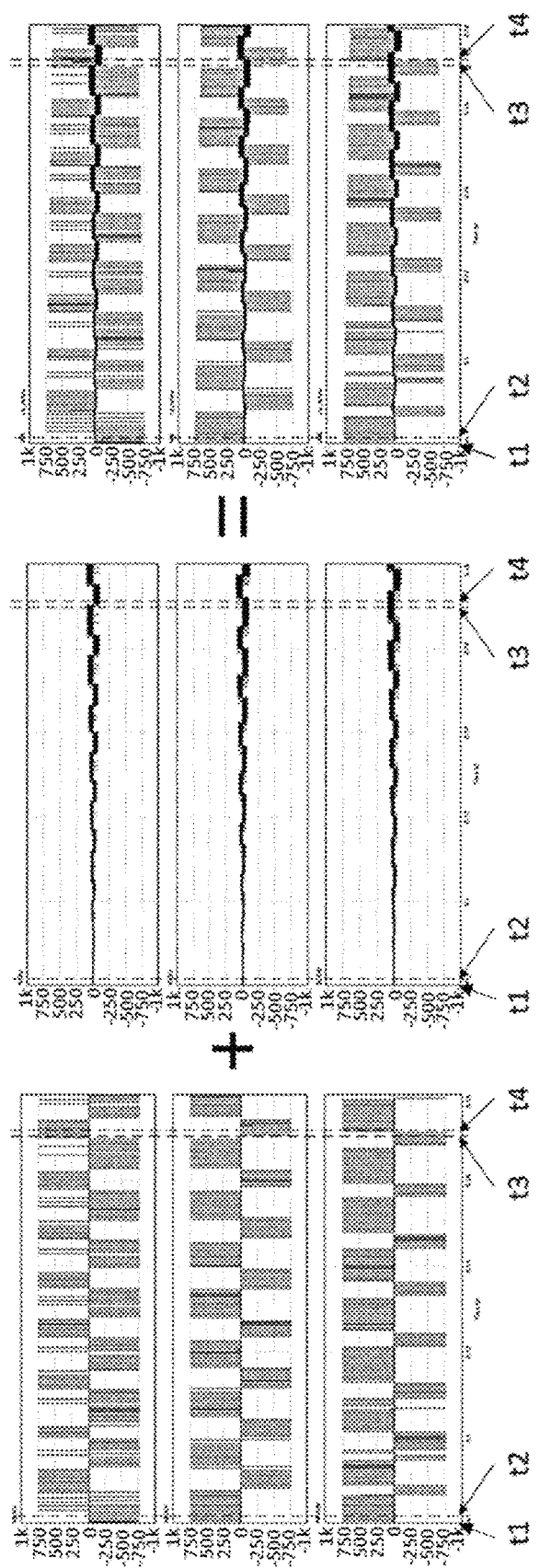
FIG. 4 is an output voltage waveform diagram of the gradationally controlled voltage inverter in step S301 according to Embodiment 1.
Figure 5:
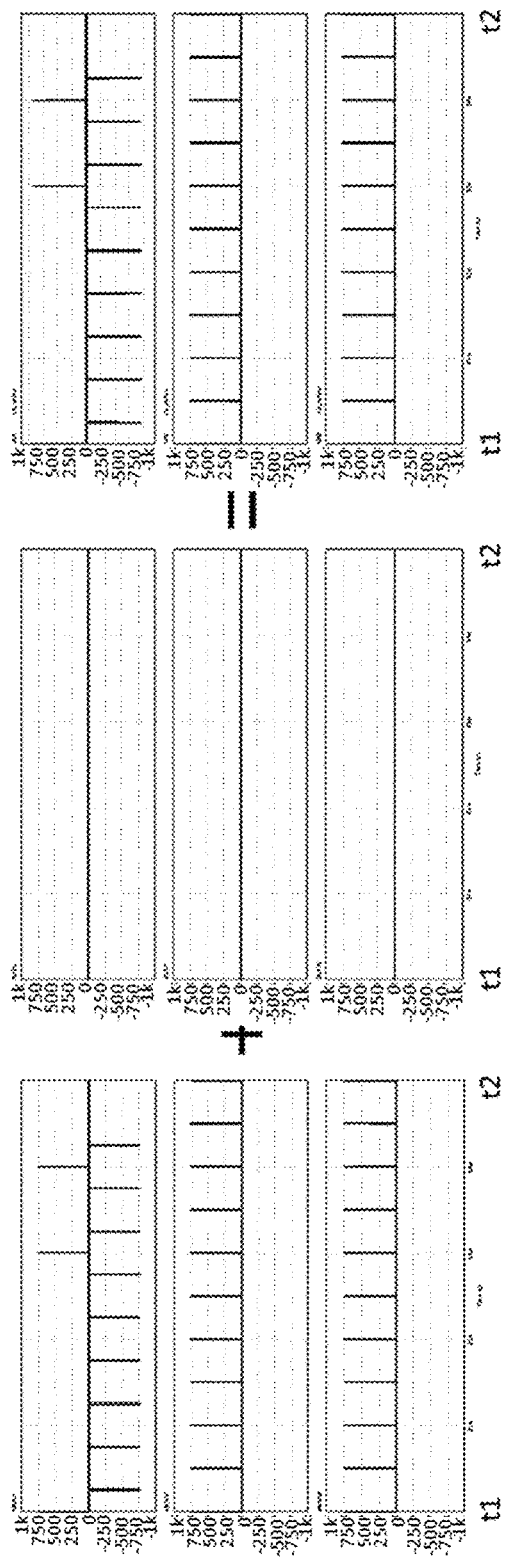
FIG. 5 is an output voltage waveform diagram of the gradationally controlled voltage inverter in step S301 according to Embodiment 1.
Figure 6:
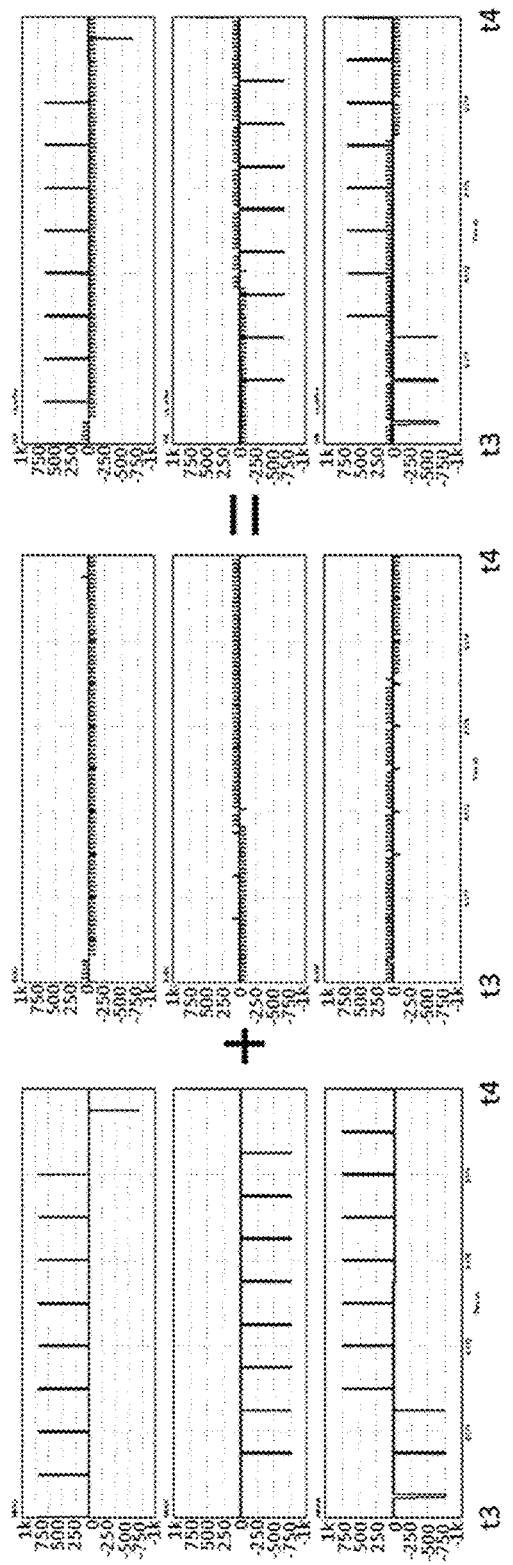
FIG. 6 is an output voltage waveform diagram of the gradationally controlled voltage inverter in step S301 according to Embodiment 1.

FIGS. 4 to 6 are output voltage waveform diagrams of the gradationally controlled voltage inverter 2 in step S301 of Embodiment 1. These are the output voltage waveform diagrams of the gradationally controlled voltage inverter 2 when the capacitor voltage VDCS of the sub-inverter 30 is still in its initial charging stage, not yet controlled at the predetermined voltage, and is in a transient state of gradually increasing from zero voltage to the predetermined voltage. The vertical axis represents the output voltage, and the horizontal axis represents the time. In FIGS. 4 to 6, for each of the output voltage waveform diagrams, the upper row corresponds to the U-phase; the middle row corresponds to the V-phase; the lower row corresponds to the W-phase, and the left column corresponds to the main inverter 20; the middle column corresponds to the sub-inverter 30; the right column corresponds to the gradationally controlled voltage inverter 2 and shows the output voltage waveforms of the phase voltages of the output voltages of the main inverter 20 and the output voltages of the sub-inverter 30. It is assumed that, in FIGS. 4 to 6, the DC bus voltage VDCM of the main inverter 20 is 1.5 kV and the predetermined voltage is 375V, which is ¼ of the VDCM voltage. In FIG. 4, the initial charging stages are divided by times t1, t2, t3, and t4. FIG. 5 shows enlarged output voltage waveforms in time t1-t2 when the capacitor voltage VDCS of the sub-inverter 30 is close to zero voltage. FIG. 6 shows enlarged output voltage waveforms in time t3-t4 when the capacitor voltage VDCS of the sub-inverter 30 is higher than in time t1-t2.

As shown in FIG. 5, when the capacitor voltage VDCS of the sub-inverter 30 is close to zero voltage, an amount of voltage change of the output voltage of the main inverter 20 is applied to the load 4 as the output of the gradationally controlled voltage inverter 2. In the present embodiment, the main inverter 20 is a three-level inverter, so that the main inverter 20 applies 750 V, which is ½ of the VDCM voltage, to the load 4.

The capacitor voltage VDCS of the sub-inverter 30 is increased more in time t3-t4 shown in FIG. 6 than in time t1-t2 shown in FIG. 5. Therefore, compared to FIG. 5, the amount of voltage change of the gradationally controlled voltage inverter 2 is slightly smaller in FIG. 6 than in FIG. 5.

However, since the capacitor voltage VDCS of the sub-inverter 30 is not controlled at the predetermined voltage, the sub-inverter 30 cannot fully cancel out the large amount of voltage change of the main inverter 20. Therefore, the control unit 14 applies to the load 4, as the output of the gradationally controlled voltage inverter 2, about ½ voltage of the VDCM voltage, which is the large amount of voltage change of the output voltage of the main inverter 20.

Returning to FIG. 3, then in step S401, the control unit 14 determines whether the capacitor voltage VDCS of the sub-inverter 30 is controlled at the predetermined voltage. As shown in FIG. 4, the control unit 14 gradually increases the capacitor voltage VDCS of the sub-inverter 30 to the predetermined voltage to perform the initial charging by performing switching for the main inverter 20 and the sub-inverter 30. After the capacitor voltage VDCS of the sub-inverter 30 is increased to the predetermined voltage and the initial charging is completed, the control unit 14 controls the capacitor voltage VDCS of the sub-inverter 30 at the predetermined voltage. That is, the control unit 14 controls the capacitor voltage VDCS of the sub-inverter 30 to be maintained at the predetermined voltage. If the control unit 14 determines that the capacitor voltage VDCS of the sub-inverter 30 is not controlled at the predetermined voltage (NO in S401), the process returns to step S301.

Next, the operation of the gradationally controlled voltage inverter 2 when the capacitor voltage VDCS of the sub-inverter 30 is controlled at the predetermined voltage (YES in S101, YES in S401) will be described. After the capacitor voltage VDCS of the sub-inverter 30 is initially charged and controlled at the predetermined voltage, the control unit 14 operates the main inverter 20 in the PWM mode or the single pulse mode and the sub-inverter 30 in the PWM mode (S501). In step S501, the main inverter 20 is operated in the PWM mode or the single pulse mode at a switching frequency lower than that of the sub-inverter 30. In order to output the difference between the target voltage, which is sinusoidal, and the output voltage of the main inverter 20, the sub-inverter 30 is operated in the PWM mode at a switching frequency higher than that of the main inverter 20. This allows the gradationally controlled voltage inverter 2 to output an accurate output voltage.

Figure 7:
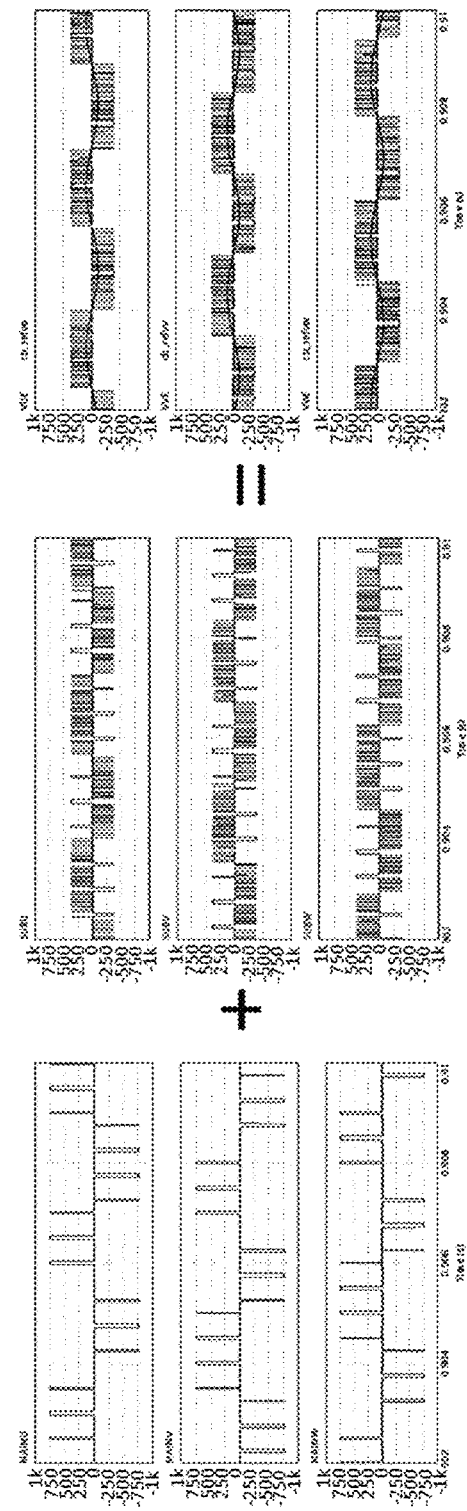
FIG. 7 is an output voltage waveform diagram of the gradationally controlled voltage inverter in step S501 according to Embodiment 1.
Figure 8:
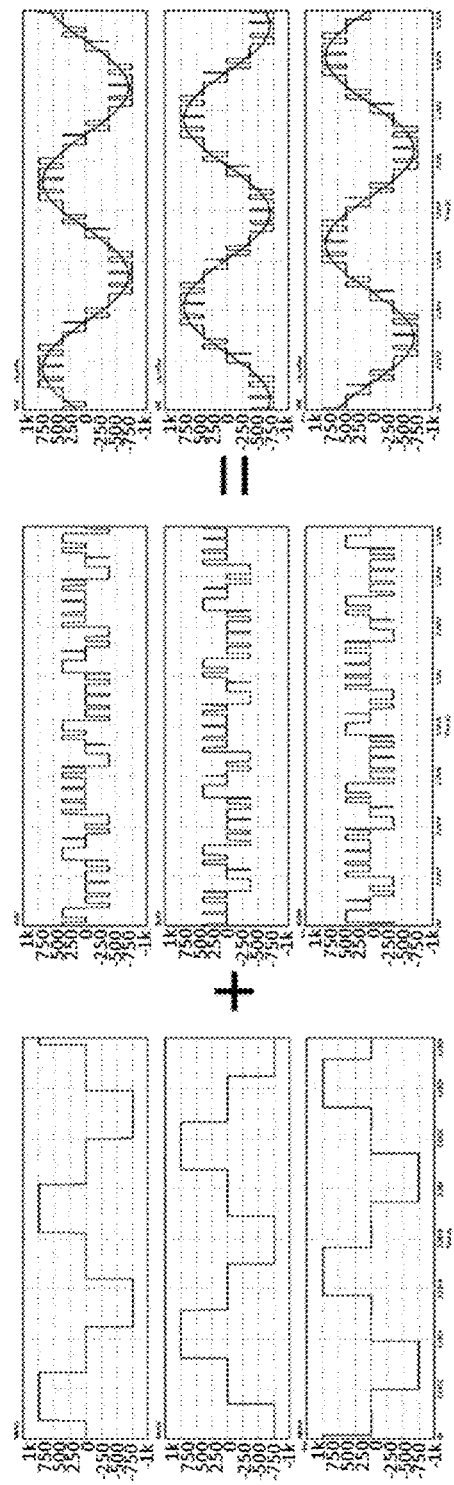
FIG. 8 is an output voltage waveform diagram of the gradationally controlled voltage inverter in step S501 according to Embodiment 1.

Here, the case in which the main inverter 20 is operated in the PWM mode and the case in which the main inverter 20 is operated in the single pulse mode, in step S501, are described using FIG. 7 and FIG. 8, respectively. FIG. 7 and FIG. 8 are the output voltage waveform diagrams of the gradationally controlled voltage inverter 2 in step S501 of Embodiment 1. The vertical axis represents the output voltage, and the horizontal axis represents the time. In FIG. 7 and FIG. 8, for each of the output voltage waveform diagrams, the upper row corresponds to the U-phase; the middle row corresponds to the V-phase; the lower row corresponds to the W-phase, and the left column corresponds to the main inverter 20; the middle column corresponds to the sub-inverter 30; the right column corresponds to the gradationally controlled voltage inverter 2 and shows the output voltage waveforms of the phase voltages of the output voltages of the main inverter 20 and the output voltages of the sub-inverter 30. It is assumed that, in FIG. 7 and FIG. 8, the DC bus voltage VDCM of the main inverter 20 is 1.5 kV and the predetermined voltage is 375V, which is ¼ of the VDCM voltage. The waveforms of the target voltage are superimposed on the output voltage waveforms of the gradationally controlled voltage inverter 2 shown in the right columns of FIG. 7 and FIG. 8.

FIG. 7 shows the case in which the capacitor voltage VDCS of the sub-inverter 30 is controlled at the predetermined voltage and the control unit 14 operates the main inverter 20 in the PWM mode to output the target voltage. Under the control of the control unit 14, the sub-inverter 30 operates in the PWM mode and performs the switching at a higher frequency than the main inverter 20. The sub-inverter 30 outputs the difference between the target voltage of the gradationally controlled voltage inverter 2 and the output voltage of the main inverter 20. In step S501, the capacitor voltage VDCS of the sub-inverter 30 is controlled at the predetermined voltage, so that the sub-inverter 30 can output a desired output voltage. Therefore, unlike in step S301 shown in FIG. 4, the control unit 14 performs addition or subtraction on the large amount of voltage change by the main inverter 20 using the output voltage of the sub-inverter. Thus, the control unit 14 causes the gradationally controlled voltage inverter 2 to output to the load 4 the amount of voltage change corresponding to ¼ voltage of the bus voltage value VDCM of the main inverter 20.

FIG. 8 shows the case in which the capacitor voltage VDCS of the sub-inverter 30 is controlled at the predetermined voltage and the control unit 14 operates the main inverter 20 in the single pulse mode. The switching frequency when the main inverter 20 operates in the single pulse mode is almost equal to the fundamental frequency outputted by the power conversion device 1 (frequency of the target voltage), and under the control of the control unit 14, the main inverter 20 performs the switching of one positive and one negative per one cycle. As in FIG. 7, the sub-inverter 30 operates in the PWM mode and performs the switching at a higher frequency than the main inverter 20. The sub-inverter 30 outputs the difference between the target voltage of the gradationally controlled voltage inverter 2 and the output voltage of the main inverter 20. That is, the addition or subtraction of the output voltage of the sub-inverter 30 is performed on a single pulse output voltage of the main inverter 20, and the result is outputted as the output voltage of the gradationally controlled voltage inverter 2. Therefore, as shown in the output voltage waveform diagrams on the right column of FIG. 8, the output voltage waveforms of the gradationally controlled voltage inverter 2 can be formed into multi-level waveforms that are almost sinusoidal. In FIG. 8, the output voltage of the gradationally controlled voltage inverter 2 is shown as a 5-level waveform. However, the output voltage of the gradationally controlled voltage inverter 2 can be outputted as a 7-level waveform at maximum by increasing the target voltage.

Returning to FIG. 3, then in step S601, the control unit 14 controls the gate impedance changing means of the gate drive circuits 24 and 34 to reduce the gate impedances of the main inverter 20 and the sub-inverter 30. Step S601 is performed in a predetermined time period after the capacitor voltage VDCS of the sub-inverter 30 is controlled at the predetermined voltage. The predetermined time period of the present embodiment is assumed to be after the capacitor voltage VDCS of the sub-inverter 30 is controlled at the predetermined voltage (after YES in S101 or YES in S401) and before the loss of the semiconductor switches reaches an acceptable limit. The acceptable limit of the loss of the semiconductor switches is set to, for example, a temperature derated from the maximum junction temperature of the semiconductor switches. Therefore, the order of performing steps S501 and S601 is not limited to that in the above description and may be reversed or even simultaneous.

At this point, the gradationally controlled voltage inverter 2 ends its operation.

Next, step S201 in FIG. 3 will be described in detail.

In general, the amount of noise relative to the voltage change associated with the switching increases as the range of the voltage change ΔV and the slope of dV/dt, which are the amounts representing the voltage change, increase. Also, a surge voltage becomes larger as the slope of dV/dt increases. Therefore, as shown in FIG. 4, there has been a problem that, in the case where the capacitor voltage VDCS of the sub-inverter 30 is not controlled at the predetermined voltage, when the large amount of voltage change by the main inverter 20 is applied to the load 4, large noise occurs. Noise standards are often specified not only in terms of the average noise level, but also in terms of the peak value and the maximum value. Thus, if the gradationally controlled voltage inverter 2 is designed considering the occurrence of a large amount of voltage change during start-up as described above, there is a concern that the input noise filter 10 and the output noise filter 13 will become large.

To cope with this, in the present embodiment, in step S201 of FIG. 3, the control unit 14 slows down the switching speeds of the semiconductor switches in the main inverter 20 to reduce the noise by increasing the gate impedance of the main inverter 20.

Figure 9:
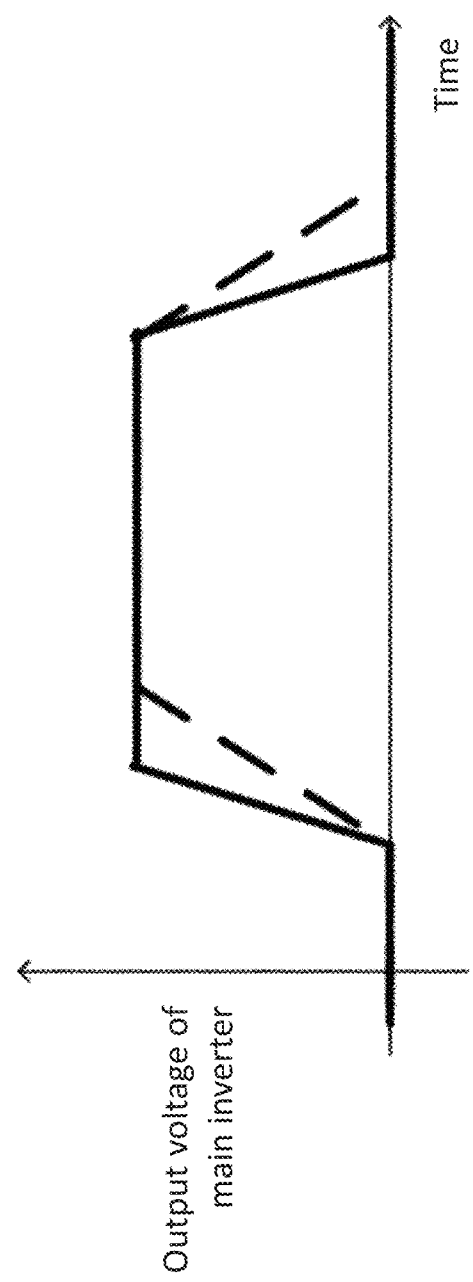
FIG. 9 is a schematic diagram showing the change over time of an output voltage of the main inverter according to Embodiment 1.

FIG. 9 is a schematic diagram showing the change over time of the output voltage of the main inverter 20 according to Embodiment 1. The vertical axis represents the output voltage, and the horizontal axis represents the time. This figure shows that as the magnitude of the gate impedance differs, the rising and falling changes over time of the output voltage of the main inverter 20 also differ. In FIG. 9, the solid line shows the case where the gate impedance is small, and the broken line shows the case where the gate impedance is large. The slope of dv/dt is gentler when the gate impedance is large, and the switching speed is slow than when the gate impedance is small and the switching speed is fast. In addition, when the slope of dv/dt is gentle, the peak value of the surge voltage and the ringing, which is a vibration component, also tend to be moderate. Therefore, the control unit 14 can reduce the noise and the surge voltage by increasing the gate impedance and decreasing the switching speed of the main inverter 20.

Figure 10:
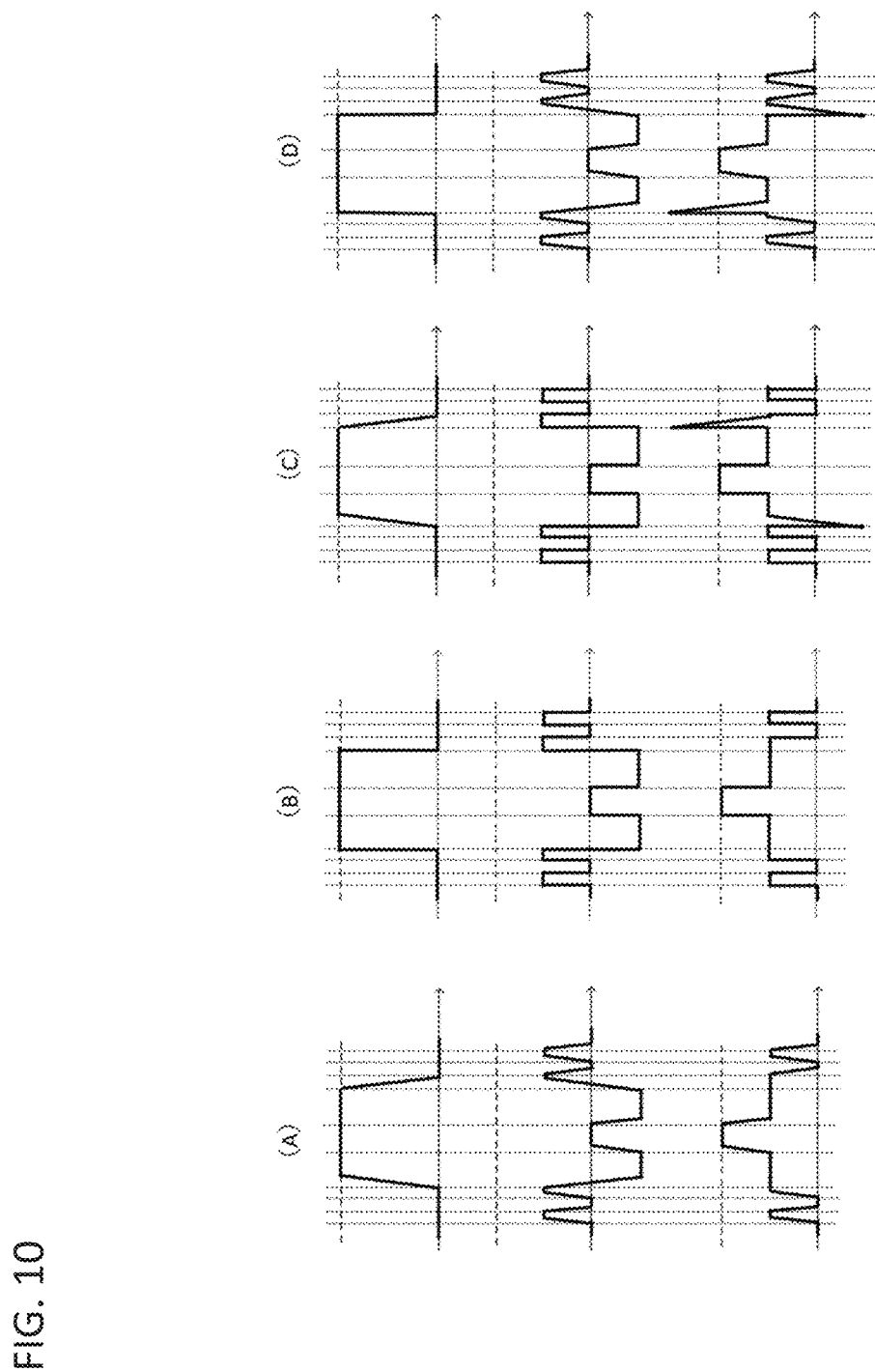
FIG. 10 is an output voltage waveform diagram of the gradationally controlled voltage inverter according to Embodiment 1.

Also, in the present embodiment, in step S201 of FIG. 3, the control unit 14 increases the gate impedance of the sub-inverter 30. That is, the control unit 14 controls the gate impedances of the main inverter 20 and the sub-inverter 30 to be larger with the same timing and in the same manner. The reason for such control will be described using FIG. 10. FIG. 10 is an output voltage waveform diagram of the gradationally controlled voltage inverter 2 according to Embodiment 1. In FIGS. 10(A) to 10(D), the upper row shows the output voltage waveform diagrams of the main inverter 20, the middle row shows the output voltage waveform diagrams of the sub-inverter 30, and the lower row shows the output voltage waveform diagrams of the gradationally controlled voltage inverter 2. The vertical axis represents the output voltage, and the horizontal axis represents the time. FIG. 10 shows the output voltage waveform diagrams when the main inverter 20 outputs a positive voltage. When the main inverter 20 outputs a negative voltage, the positive/negative direction of the voltage is reversed.

FIG. 10(A) shows the case where both the switching speed of the main inverter 20 and the switching speed of the sub-inverter 30 are slow. FIG. 10(B) shows the case where both the switching speed of the main inverter 20 and the switching speed of the sub-inverter 30 are fast. FIG. 10(C) shows the case where the switching speed of the main inverter 20 is slow and the switching speed of the sub-inverter 30 is fast. FIG. 10(D) shows the case where the switching speed of the main inverter 20 is fast and the switching speed of the sub-inverter 30 is slow.

As shown in FIG. 10(C) and FIG. 10(D), it is observed that when the switching speeds of the main inverter 20 and the sub-inverter 30 are different, thin pulses are generated and thus large amounts of voltage changes occur in the outputs of the gradationally controlled voltage inverter 2 at the timing of the outputs of the main inverter 20. These thin pulses are caused by the effects of, for example, the time difference in the switching timing between the main inverter 20 and the sub-inverter 30, the difference in the switching speed between slow switching and fast switching, and the generation of dead time for the arm short-circuit prevention, and so on.

On the other hand, as shown in FIG. 10(A) and FIG. 10(B), when the switching speeds of the main inverter 20 and the sub-inverter 30 are comparable, the thin pulses are not generated, and thus the amounts of voltage changes can be reduced in the output of the gradationally controlled voltage inverter 2. Therefore, the control unit 14 should control the gate impedances of the main inverter 20 and the sub-inverter 30 with the same timing and in the same manner and cause the main inverter 20 and the sub-inverter 30 to switch at the comparable switching speeds.

Also, in step S601, as in step S201 above, the control unit 14 can increase the switching speeds and thus achieve low-loss operation by similarly reducing the gate impedances of the main inverter 20 and the sub-inverter 30 in the same predetermined time period.

As described above, the gradationally controlled voltage inverter 2, which is the power conversion device 1 in the present embodiment, controls the gate impedance of the main inverter 20 before the capacitor voltage VDCS of the sub-inverter 30 is controlled at the predetermined voltage to be larger than the gate impedance of the main inverter 20 after the capacitor voltage VDCS of the sub-inverter 30 is controlled at the predetermined voltage. This can reduce the noise caused by the main inverter 20 when the capacitor voltage VDCS of the sub-inverter 30 is not controlled at the predetermined voltage.

A conventional gradationally controlled voltage inverter causes large noise when the capacitor voltage VDCS of the sub-inverter 30 is not controlled at the predetermined voltage during start-up, etc. However, attempting to address this by designing noise filters to meet noise standards, including operating modes at the time of start-up or the like, can make the input noise filter 10 and the output noise filter 13 larger and heavier. In contrast, the gradationally controlled voltage inverter 2 according to the present embodiment can reduce noise as described above, so that the input noise filter 10 and the output noise filter 13 can be reduced in size and weight.

Also, if the gate impedances are increased, the switching loss becomes larger. Therefore, when the capacitor voltage VDCS of the sub-inverter 30 is controlled at the predetermined voltage, the switching loss can be reduced by reducing the gate impedance of the main inverter 20.

Before the capacitor voltage VDCS of the sub-inverter 30 is controlled at the predetermined voltage, the switching loss becomes large because the gate impedance is increased. However, when the required input power is small, such as during start-up, there is no problem even if the switching losses of the main inverter 20 and the sub-inverter 30 are large. In addition, the short time it takes to control the capacitor voltage VDCS of the sub-inverter 30 at the predetermined voltage ensures that there is no problem.

Also, the gradationally controlled voltage inverter 2, which is the power conversion device 1 in the present embodiment, controls, in the same manner as it controls the gate impedance of the main inverter 20, the gate impedance of the sub-inverter 30 before the capacitor voltage VDCS of the sub-inverter 30 is controlled at the predetermined voltage to be larger than the gate impedance of the sub-inverter 30 after the capacitor voltage VDCS of the sub-inverter 30 is controlled at the predetermined voltage. That is, the control unit 14 controls the gate impedances of the main inverter 20 and the sub-inverter 30 to be increased in the same manner in the predetermined time period after the capacitor voltage VDCS of the sub-inverter 30 is controlled at the predetermined voltage. Thus, the gradationally controlled voltage inverter 2 does not produce the thin pulses and can make the amount of voltage change smaller in its output by controlling the gate impedances of the main inverter 20 and the sub-inverter 30 in the same manner in the same predetermined time period. Therefore, the input noise filter 10 and the output noise filter 13 can be made smaller while keeping noise and surge voltage under control.

Further, as shown in FIG. 8, the control unit 14 performs the high frequency switching only for the sub-inverter 30 having the low capacitor voltage VDCS by operating the main inverter 20 in the single pulse mode. This allows the switching frequency of the main inverter 20 with the high DC bus voltage VDCM to be minimized, thus reducing the switching loss. In particular, operating in the single pulse mode at high load, such as in rated operation where the current is large, is effective in reducing the switching loss. Furthermore, the gradational operation allows for multi-level voltage outputs, which in turn allows for stair-step reduction of the range of voltage change and lower noise. Therefore, the gradationally controlled voltage inverter 2 has an advantage over an inverter having only a main inverter 20, which is common.

The power conversion device 1 should be small and light when it is to be mounted on automobiles, ships, aircraft, etc. The power conversion device 1 according to the present embodiment can reduce the noise caused by the main inverter 20 as described above, so that the output noise filter 13 can be reduced in size and weight. The power conversion device 1 does not require the initial charging circuit for the capacitors 35 of the sub-inverter 30, the initial charging circuit being composed of current limiting resistors and switches, etc. In addition, the power conversion device 1 makes it possible to reduce the size and weight of its cooler due to its low-loss performance, and to reduce the size and weight of the output noise filter 13 due to its multilevel voltage output capability. Therefore, the power conversion device 1 to be mounted on automobiles, ships, aircraft, etc. can be configured to be small and light.

In the description, the diode-clamped three-level inverter is used as an example for the main inverter 20. With the three-level inverter, the number of voltage levels that can be outputted to the load 4 increases compared to a two-level inverter. Therefore, harmonic components contained in the output voltage can be suppressed without increasing switching frequency. In addition, in the diode-clamped three-level inverter, by halving the output voltage level, the input noise filter 10 and the output noise filter 13 can be reduced in size, and the voltage to be applied to the semiconductor switches of the sub-inverter 30 can be halved.

For example, when the power conversion device 1 is to be installed in an aircraft, the voltage margin of the semiconductor switches must be set higher than when used on the ground because of the operating environment of intense cosmic ray exposure due to high altitude. Therefore, by using the diode-clamped three-level inverter for the main inverter 20, low-voltage devices can be used instead of large and expensive high-voltage devices.

In the description, a three-phase inverter is used as an example of the main inverter 20. For example, for the same voltage, $\sqrt{3}$ times more power can be used when the main inverter 20 is a three-phase inverter than when the main inverter 20 is a single-phase inverter. In addition, considering that power and voltage are equivalent, higher efficiency can be achieved because the current is lower.

Embodiment 2

Figure 11:
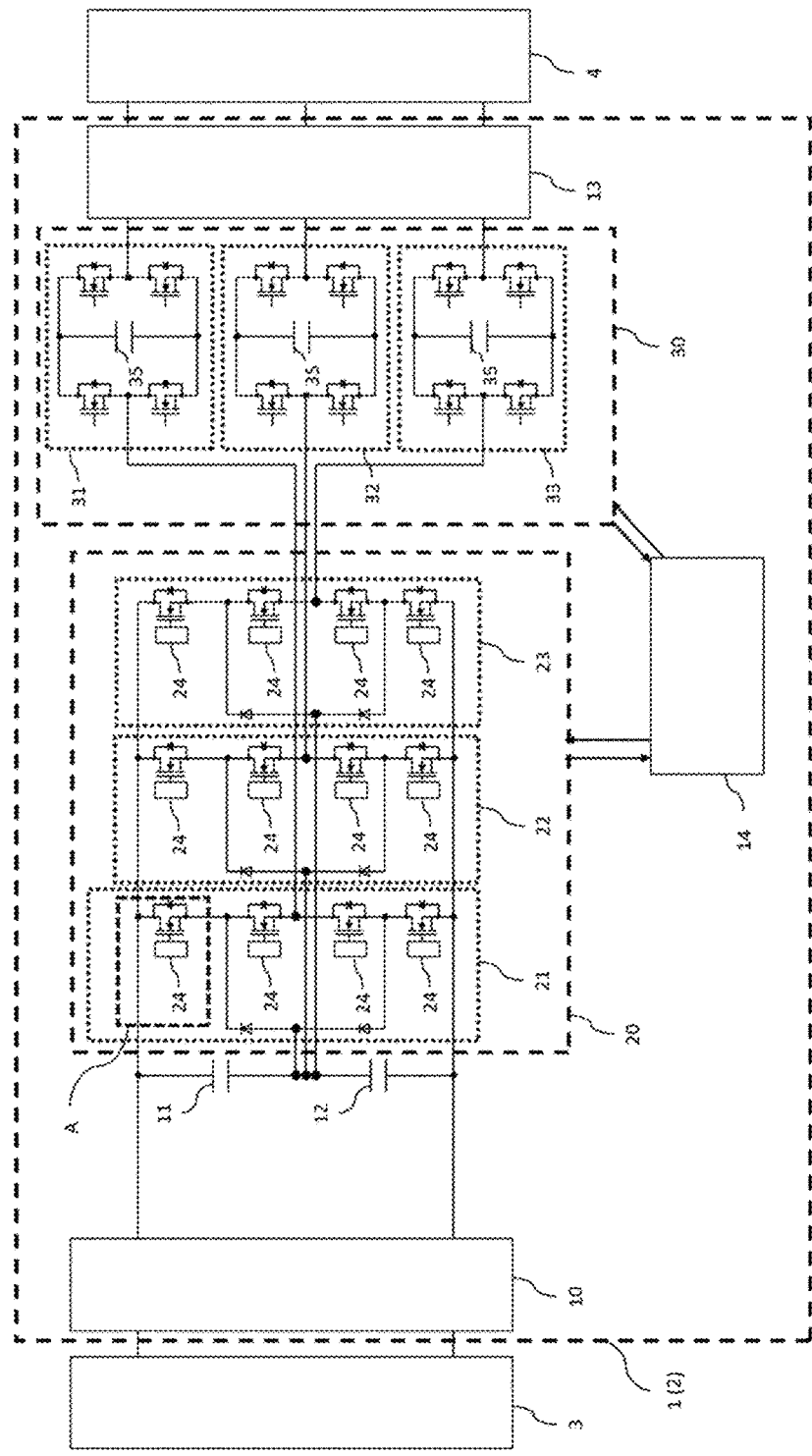
FIG. 11 is a circuit diagram showing a configuration of a gradationally controlled voltage inverter according to Embodiment 2.

A gradationally controlled voltage inverter 2, which is the power conversion device 1 in Embodiment 2, will be described using in FIG. 11. FIG. 11 is a circuit diagram showing a configuration of the gradationally controlled voltage inverter 2 according to Embodiment 2. The gradationally controlled voltage inverter 2 in Embodiment 2 is characterized in that it does not include the gate drive circuits 34 with the gate impedance changing means. The other configurations of the gradationally controlled voltage inverter 2 are the same as those in Embodiment 1. The same components as in Embodiment 1 are marked with the same symbols.

As shown in FIG. 11, in the gradationally controlled voltage inverter 2, the main inverter 20 includes the gate drive circuits 24 with the gate impedance changing means and the sub-inverter 30 does not include the gate drive circuits 34 with the gate impedance changing means.

Figure 12:
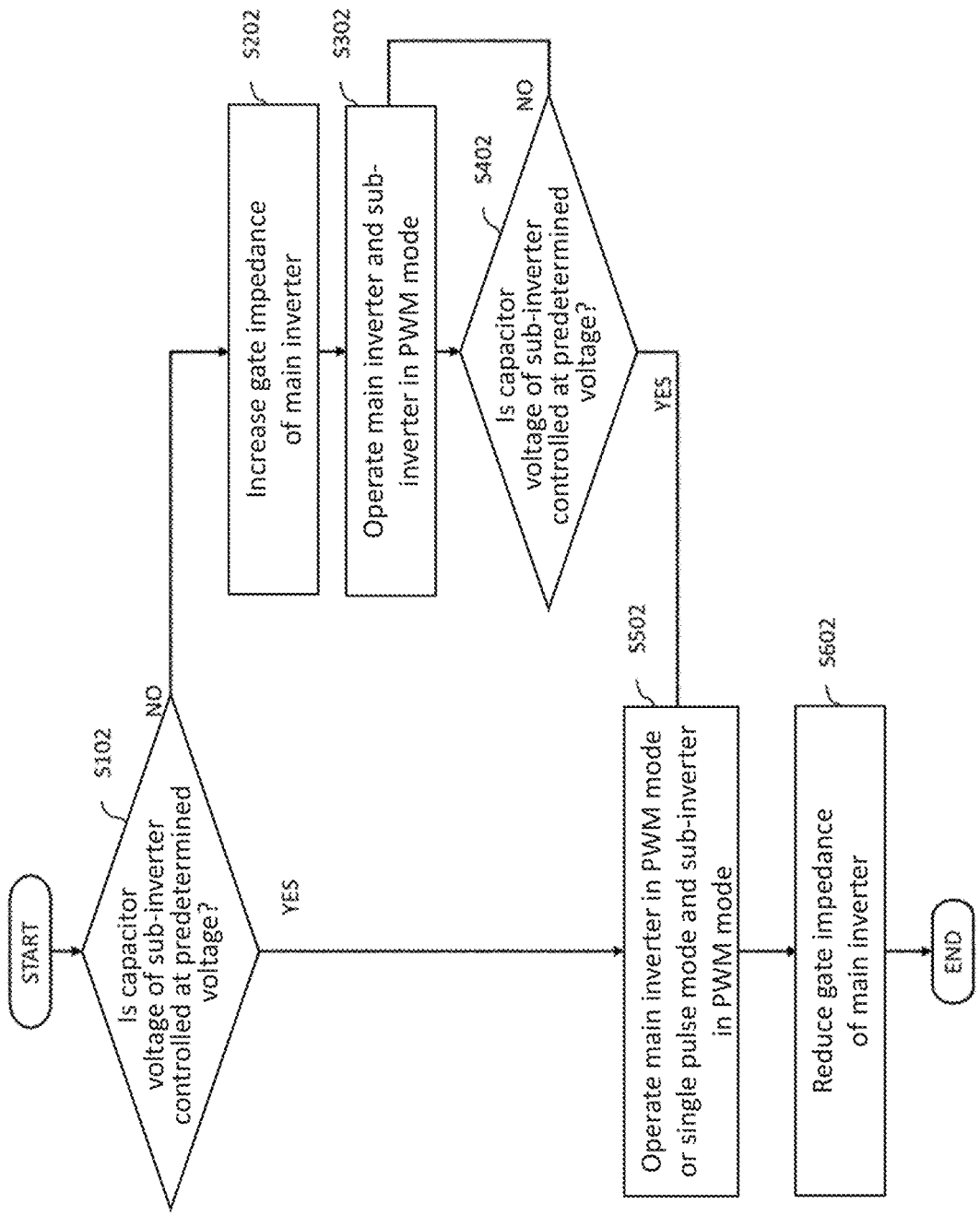
FIG. 12 is a flowchart showing an operation of the gradationally controlled voltage inverter according to Embodiment 2.

Next, the operation of the gradationally controlled voltage inverter 2, which is the power conversion device 1 of the present embodiment, will be described. FIG. 12 is a flowchart showing an operation of the gradationally controlled voltage inverter 2 of Embodiment 2.

First, in step S102, the control unit 14 determines whether the capacitor voltage VDCS of the sub-inverter 30 detected by the voltage detection means of the sub-inverter 30 is controlled at the predetermined voltage.

In step S202, when the control unit 14 determines that the capacitor voltage VDCS of the sub-inverter 30 is not controlled at the predetermined voltage (NO in S102), the control unit 14 controls the gate impedance changing means of the gate drive circuits 24 to increase the gate impedance of the main inverter 20. Here, increasing the gate impedance of the main inverter 20 means causing the gate impedance of the main inverter 20 to be larger than the gate impedance of the main inverter 20 resulting after the capacitor voltage VDCS of the sub-inverter 30 is controlled at the predetermined voltage in step S602 to be described later.

In step S302, the control unit 14 operates the main inverter 20 and the sub-inverter 30 in the PWM mode.

In step S402, the control unit 14 determines whether the capacitor voltage VDCS of the sub-inverter 30 is controlled at the predetermined voltage.

In step S502, when the capacitor voltage VDCS of the sub-inverter 30 is controlled at the predetermined voltage (YES in S102, YES in S402), the main inverter 20 is operated in the PWM mode or in the single pulse mode, and the sub-inverter 30 is operated in the PWM mode.

In step S602, during the time period after the capacitor voltage VDCS of the sub-inverter 30 is controlled at the predetermined voltage and before the loss of the semiconductor switches reaches the acceptable limit, the control unit 14 controls the gate impedance changing means of the gate drive circuits 24 to decrease the gate impedance of the main inverter 20.

At this point, the gradationally controlled voltage inverter 2 ends its operation.

The gradationally controlled voltage inverter 2 in the present embodiment is characterized in that it does not include the gate drive circuits 34 with the gate impedance changing means in the sub-inverter 30. Therefore, the gradationally controlled voltage inverter 2 of the present embodiment cannot make the switching speeds of the main inverter 20 and the sub-inverter 30 comparable by controlling the gate impedance changing means of the main inverter 20 and the sub-inverter 30, as the gradationally controlled voltage inverter 2 of the Embodiment 1 does. In this case, some measures must be taken in step S202 to suppress the generation of the thin pulses, as shown in FIG. 10(C), in the output of the gradationally controlled voltage inverter 2 to reduce the amount of voltage change. The operation of the gradationally controlled voltage inverter 2 in the present embodiment for solving this problem will be described using FIG. 13.

Figure 13:
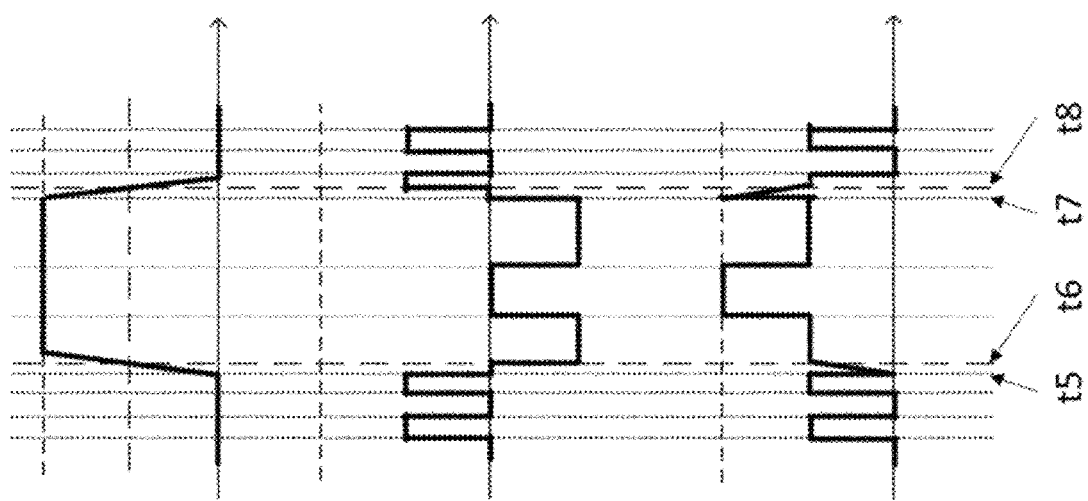
FIG. 13 is an output voltage waveform diagram of the gradationally controlled voltage inverter in step S302 according to Embodiment 2.

FIG. 13 is an output voltage waveform diagram of the gradationally controlled voltage inverter 2 in step S302 according to Embodiment 2. In FIG. 13, the upper row shows the output voltage waveform diagrams of the main inverter 20, the middle row shows the output voltage waveform diagrams of the sub-inverter 30, and the lower row shows the output voltage waveform diagrams of the gradationally controlled voltage inverter 2. The vertical axis represents the output voltage, and the horizontal axis represents the time. FIG. 13 shows the output voltage waveform diagrams when the main inverter 20 outputs a positive voltage. When the main inverter 20 outputs a negative voltage, the positive/negative direction of the voltage is reversed.

In step S202, the control unit 14 increases the gate impedance of the main inverter 20, slows down the switching speed, and makes the slope of dv/dt, which is the rise of the output voltage waveform, gentler. On the other hand, the switching speed of the sub-inverter 30 is faster than that of the main inverter 20 because the sub-inverter 30 does not include the gate drive circuits 34 with the gate impedance changing means.

In Step S302, the control unit 14 controls the sub-inverter 30 to output a zero voltage instead of a large amount of voltage change reversing the output voltage from positive to negative, as shown in FIG. 10(C), at the switching time (t5) to the rise of the output voltage of the main inverter 20. Then, the control unit 14 controls the sub-inverter 30 to output a negative voltage at the midpoint (t6) during the rise of the output voltage of the main inverter 20. Then, the control unit 14 controls the sub-inverter 30 to output a zero voltage at the switching time (t7) to the fall of the output voltage of the main inverter 20 and to output a positive voltage at the midpoint (t8) during the fall of the output voltage of the main inverter 20. This makes it possible to suppress the generation of the thin pulses and to reduce the amount of voltage change in the output of the gradationally controlled voltage inverter 2.

After controlling the gate impedance of the main inverter 20 to be small during the predetermined time period after the capacitor voltage VDCS of the sub-inverter 30 is controlled at the predetermined voltage, in step S602, the control unit 14 controls the sub-inverter 30 to cancel out the voltage with respect to the main inverter 20, as shown in FIG. 10(B).

As in Embodiment 1, the gradationally controlled voltage inverter 2, which is the power conversion device 1 in the present embodiment, controls the gate impedance of the main inverter 20 before the capacitor voltage VDCS of the sub-inverter 30 is controlled at the predetermined voltage to be larger than the gate impedance of the main inverter 20 after the capacitor voltage VDCS of the sub-inverter 30 is controlled at the predetermined voltage. This can reduce the noise caused by the main inverter 20 when the capacitor voltage VDCS of the sub-inverter 30 is not controlled at the predetermined voltage.

In addition, before the gate impedance of the main inverter 20 is controlled to be small, the control unit 14 controls the sub-inverter 30 in such a way that its output voltage is a zero voltage at the switching timings to the rise and to the fall of the output voltage of the main inverter 20. This makes it possible to suppress the generation of the thin pulses and to reduce the amount of voltage change in the output of the gradationally controlled voltage inverter 2. As a result, the input noise filter 10 and the output noise filter 13 can be made smaller and lighter while keeping noise and surge voltage under control.

In addition, the gradationally controlled voltage inverter 2, which is the power conversion device 1 in the present embodiment, can be made smaller and lighter because it does not require the gate impedance changing means in the sub-inverter 30.

Embodiment 3

A gradationally controlled voltage inverter 2, which is the power conversion device 1 in Embodiment 3, has the same circuit configuration as that of the gradationally controlled voltage inverter 2 in Embodiment 1 or Embodiment 2.

In step S601 in FIG. 3 of Embodiment 1, during the time period after the capacitor voltage VDCS of the sub-inverter 30 is controlled at the predetermined voltage and before the loss of the semiconductor switches reaches the acceptable limit, the control unit 14 controls the gate impedance changing means of the gate drive circuits 24 and 34 to decrease the gate impedance of the main inverter 20 and the sub-inverter 30. In the present embodiment, the time period in which the gate impedances of the gate drive circuits 24 and 34 are reduced is more optimized.

Figure 14:
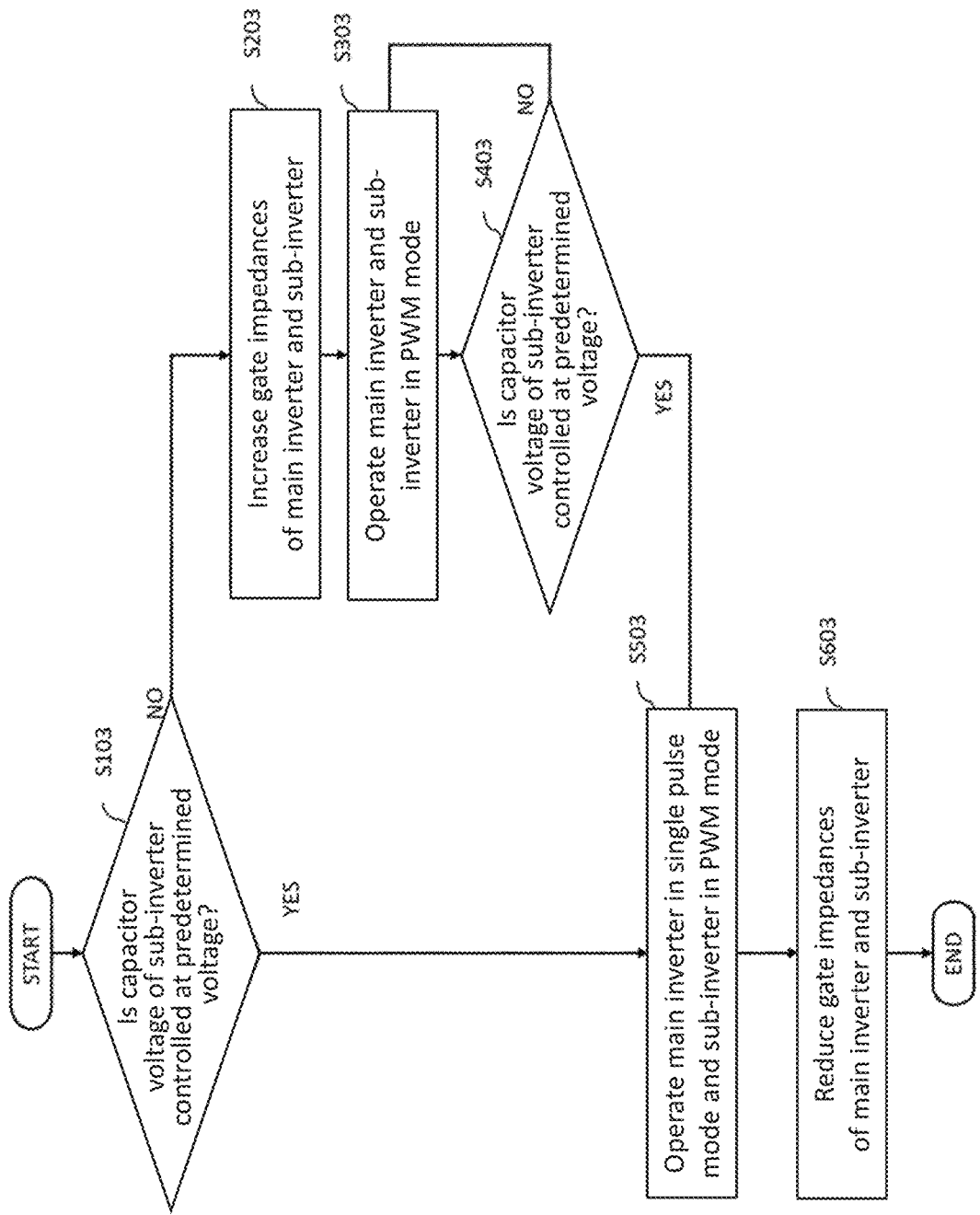
FIG. 14 is a flowchart showing an operation of a gradationally controlled voltage inverter according to Embodiment 3.

An operation of the gradationally controlled voltage inverter 2, which is the power conversion device 1 of the present embodiment, will be described using FIG. 14. FIG. 14 is a flowchart showing the operation of the gradationally controlled voltage inverter 2 according to Embodiment 3.

Steps S103 to S403 are the same as steps S101 to S401 in Embodiment 1 or steps S102 to S402 in Embodiment 2.

In step S503, the control unit 14 operates the main inverter 20 in the single pulse mode and the sub-inverter 30 in the PWM mode. That is, the control unit 14 switches the operation mode of the main inverter 20 from the PWM mode to the single pulse mode.

In step S603, the control unit 14 controls the gate impedance changing means of the gate drive circuits 24 and 34 to reduce the gate impedances of the main inverter 20 and the sub-inverter 30. In step S603, the predetermined time period for changing the gate impedances of the main inverter 20 and the sub-inverter 30 is the time period after the capacitor voltage VDCS of the sub-inverter 30 is controlled at the predetermined voltage and before the loss of the semiconductor switches reaches the acceptable limit and during which the output voltage is held at a zero voltage point where the main inverter 20 does not switch. The more desirable predetermined time period is the time period during which the operation mode of the main inverter 20 is switched from the PWM mode to the single pulse mode in step S503 described above. In the case of the circuit configuration of the gradationally controlled voltage inverter 2 in Embodiment 2, the control unit 14 controls the gate impedance changing means of the gate drive circuits 24 to reduce the gate impedance of the main inverter 20.

Figure 15:
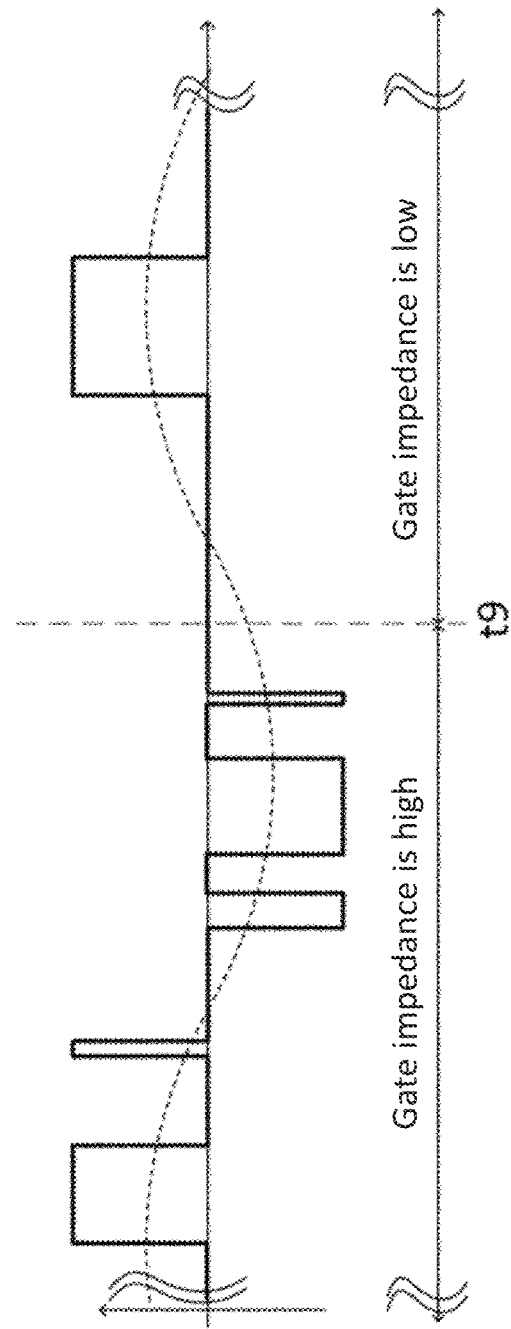
FIG. 15 is a diagram to illustrate step S603 according to Embodiment 3.

FIG. 15 is a diagram to illustrate step S603 according to Embodiment 3. In the upper row of FIG. 15, the solid line shows an output voltage waveform diagram of the main inverter 20, and the broken line shows the target voltage waveform. In the lower row of FIG. 15, the magnitude of the gate impedance of the main inverter 20 is shown. In FIG. 15, the time t9 is the time at which the operation mode of the main inverter 20 is switched from the PWM mode to the single pulse mode in step S503. The time t9 is in the time period during which the output voltage is held at the zero voltage point where the main inverter 20 does not switch. At the time t9, the control unit 14 controls the gate impedance changing means of the gate drive circuits 24 of the main inverter 20 to change the gate impedance of the main inverter 20 from high to low. Similarly, at the time t9, the control unit 14 may control the gate impedance changing means of the gate drive circuits 34 of the sub-inverter 30 to change the gate impedance of the sub-inverter 30 from high to low. Note that, when the operation mode is changed from the single pulse mode to the PWM mode, the gate impedance may be changed from low to high.

As in Embodiment 1, the gradationally controlled voltage inverter 2, which is the power conversion device 1 in the present embodiment, controls the gate impedance of the main inverter 20 before the capacitor voltage VDCS of the sub-inverter 30 is controlled at the predetermined voltage to be larger than the gate impedance of the main inverter 20 after the capacitor voltage VDCS of the sub-inverter 30 is controlled at the predetermined voltage. This can reduce the noise caused by the main inverter 20 when the capacitor voltage VDCS of the sub-inverter 30 is not controlled at the predetermined voltage.

The gradationally controlled voltage inverter 2, which is the power conversion device 1 in the present embodiment, is characterized in that the impedances of the gate drive circuits 24 of the main inverter 20 are changed in the predetermined time period during which the output voltage is held at the zero voltage point where the main inverter 20 does not switch. The effect of this configuration will be described below.

In the gradationally controlled voltage inverter 2, especially the main inverter 20 outputs a large voltage even if the slope of dv/dt of the output voltage at switching is moderated by increasing its gate impedance. Although the output voltage of the sub-inverter 30 is lower than the output voltage of the main inverter 20, it is outputted to cancel out the output voltage of the main inverter 20 in synchronization with the timing of the output voltage of the main inverter 20. In Embodiment 2, the output timing of the sub-inverter 30 is slightly off relative to the main inverter 20. However, in the present embodiment, the output timings of the main inverter 20 and the sub-inverter 30 are almost synchronized because the sub-inverter 30 operates at the rise and fall as well as in the middle of the rise and in the middle of the fall of the main inverter 20. Thus, the gradationally controlled voltage inverter 2 reduces the amount of noise to the load 4 through the synchronous control of the main inverter 20 and the sub-inverter 30. However, the semiconductor switches of the main inverter 20 and the sub-inverter 30 transmit noise caused by their own switching to the gate drive circuits 24 and 34 in their immediate vicinities. Therefore, it should be avoided to change the gate impedances of the gate drive circuits 24 of the main inverter 20 at the switching timing of the semiconductor switches of the main inverter 20 that output a large voltage.

For example, consider the case in which the control unit 14 changes the gate impedances of the main inverter 20 and the sub-inverter 30 at the timing when a high voltage and a high current are switched in the semiconductor switches of the main inverter 20 and the sub-inverter 30. In this case, the gate drive circuits 24 and 34 are affected by the noise generated by the switching of high voltage and the high current. As a result, the transistors 41 to 44 of the gate drive circuits 24 and 34 may not turn on when they should and may turn on erroneously at a different timing due to the negative effect on the performance of the gate drive circuits 24 and 34 caused by the noise generated within the inverter circuits, which is known as self-poisoning. If the noise completely obstructs the turning on of the transistors 41 to 44 of the gate drive circuits 24 and 34, the worst case is operation at high gate impedances. This results in excessive switching losses. Meanwhile, if only one of the gate impedances of the main inverter 20 and the sub-inverter 30 switches, the intended synchronous control may not be achieved.

Here, the time widths during which the zero voltage point is held when operating in the single pulse mode and when operating in the PWM mode will be described. As shown in FIG. 15, when operating in the single pulse mode, the output of the positive/negative pulse occurs around the peak of the target voltage waveform in a cycle, so that the time widths during which the zero voltage point is held are long. On the other hand, when operating in the PWM mode, the outputs of the pulse voltages are distributed in several times with respect to the target voltage waveform in a cycle, so that the time widths during which the zero voltage point is held are short.

In the present embodiment, the control unit 14 changes the impedances of the gate drive circuits 24 of the main inverter 20 in the predetermined time period during which the output voltage is held at the zero voltage point where the main inverter 20 does not switch. This prevents the unintended erroneous turning on caused by the self-poisoning, etc.

As described above, when operating in the PWM mode, the time widths during which the zero voltage point is held are shortened, depending on a carrier frequency of the switching. Therefore, the control unit 14 should change the gate impedances of the main inverter 20 and the sub-inverter 30 not in the time period during which the zero voltage point is held when operating in the PWM mode, but in the time period when the operation of the main inverter 20 is switched from the PWM mode to the single pulse mode. This prevents the gradationally controlled voltage inverter 2 from changing the gate impedances at the switching time when a large amount of voltage change occurs. Since the influence of noise is eliminated, the gate impedances can be changed reliably. In addition, the gate impedances can be easily changed in synchronization with the timing of switching of the operation from the PWM mode to the single pulse mode without using any special switching sequence means.

Embodiment 4

Figure 16:
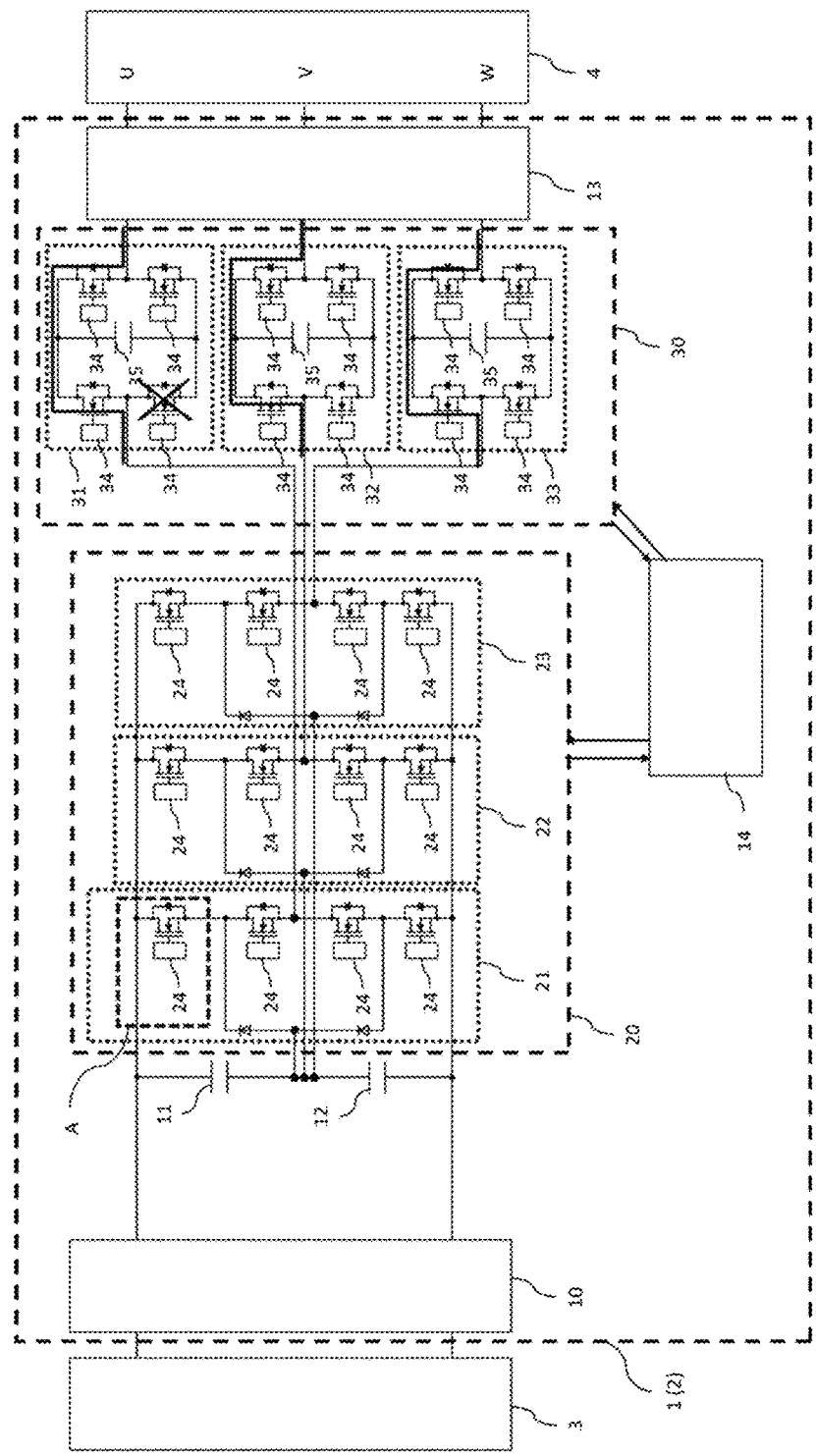
FIG. 16 is a circuit diagram showing a configuration of a gradationally controlled voltage inverter according to Embodiment 4.

The gradationally controlled voltage inverter 2, which is the power conversion device 1 in Embodiment 4, will be described using FIG. 16. FIG. 16 is a circuit diagram showing a configuration of the gradationally controlled voltage inverter 2 according to Embodiment 4. In addition to the configurations of the gradationally controlled voltage inverter 2 according to Embodiment 1 and Embodiment 2, the gradationally controlled voltage inverter 2 according to Embodiment 4 further includes a means for detecting a failure of each semiconductor switch that has failed in the sub-inverter 30.

The X mark in FIG. 16 indicates the location where a semiconductor switch has failed in the sub-inverter 30 of the gradationally controlled voltage inverter 2. For example, the semiconductor switch failure detection means detects a drain-source voltage Vds of each semiconductor device and determines whether the semiconductor switch has failed on the basis of the detected Vds voltage. Instead, the semiconductor switch failure detection means may be another type of means that is publicly known.

Figure 17:
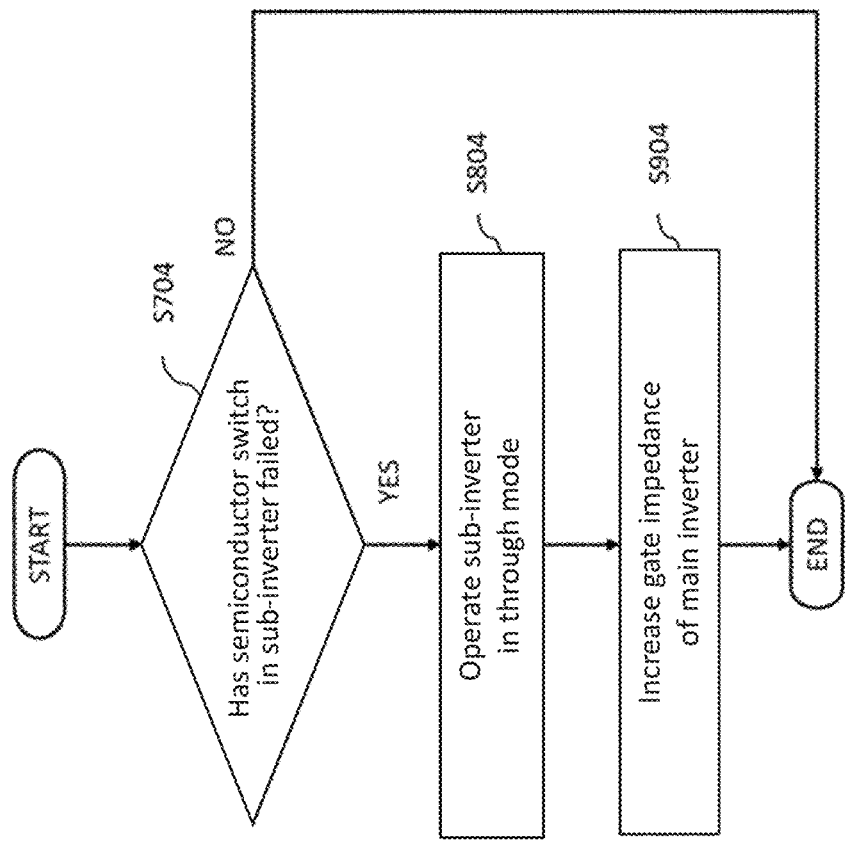
FIG. 17 is a flowchart showing an operation of the gradationally controlled voltage inverter according to Embodiment 4.

After the capacitor voltage VDCS of the sub-inverter 30 is controlled at the predetermined voltage, the gradationally controlled voltage inverter 2 according to the present embodiment operates the main inverter 20 in the single pulse mode and the sub-inverter 30 in the PWM mode in order to reduce the switching losses. In this case, the sub-inverter 30 is heavily loaded because it switches at a higher frequency than the main inverter 20. As a result, the sub-inverter 30 is more likely to fail earlier than the main inverter 20. Thus, the operation of the gradationally controlled voltage inverter 2 when any of the semiconductor switches in the sub-inverter 30 has failed will be described using FIG. 17. FIG. 17 is a flowchart showing an operation of the gradationally controlled voltage inverter 2 according to Embodiment 4. Here, START in FIG. 17 follows the processing of the respective steps S601, S602, and S603 of Embodiments 1 to 3.

First, in step S704, the control unit 14 determines whether any of the semiconductor switches in the sub-inverter 30 has failed by the means for detecting a failure of each semiconductor switch that has failed.

For example, if any of the semiconductor switches in the sub-inverter 30 has failed (YES in S704), the control unit 14 changes the operation to a through mode in which the output voltage of the main inverter 20 is directly outputted to the load 4 (S804). Specifically, the control unit 14 sets and keeps the two semiconductor switches on the high potential side always ON or the two semiconductor switches on the low potential side always ON in the capacitors 35 of the sub-inverter 30. Then, the control unit 14 controls the gate drive circuits 24 in the main inverter 20 to slow down the switching speed by increasing the gate impedance of the main inverter 20 (S904). Here, increasing the gate impedance of the main inverter 20 means increasing it to be larger than the gate impedance of the main inverter 20 before detecting the failure in the semiconductor switches of the sub-inverter 30 in S704. This allows the gradationally controlled voltage inverter 2 to be operated in the PWM mode only by the main inverter 20. The main inverter 20 can be operated with reduced noise by slowing down the switching speed as described above.

As in Embodiment 1, the gradationally controlled voltage inverter 2, which is the power conversion device 1 in the present embodiment, controls the gate impedance of the main inverter 20 before the capacitor voltage VDCS of the sub-inverter 30 is controlled at the predetermined voltage to be larger than the gate impedance of the main inverter 20 after the capacitor voltage VDCS of the sub-inverter 30 is controlled at the predetermined voltage. This can reduce the noise caused by the main inverter 20 when the capacitor voltage VDCS of the sub-inverter 30 is not controlled at the predetermined voltage.

In addition, the gradationally controlled voltage inverter 2 of the present embodiment further includes the means for detecting a failure of each semiconductor switch that has failed in the sub-inverter 30. The gradationally controlled voltage inverter 2 changes the operation of the sub-inverter 30 to the through mode when the failure of the semiconductor switches of the sub-inverter 30 is detected after the gate impedance of the main inverter 20 is controlled to be small (steps S601, S602, S603). Then, the gradationally controlled voltage inverter 2 increases the gate impedance of the main inverter 20 to be higher than that before the failure is detected in the semiconductor switches of the sub-inverter 30. This allows the gradationally controlled voltage inverter 2 to continue its operation using the main inverter 20 without increasing the noise even when the sub-inverter 30 has failed.

As the gate impedance increases, the switching loss increases, so that the power that can be delivered to the load 4 needs to be limited. It also makes it difficult to continue the operation at a high load, such as the operation at a rated power. However, an application, especially an application whose operation can never be stopped, such as an aircraft, must continue to operate even when the gradationally controlled voltage inverter 2 has failed. Therefore, it is necessary to provide redundancy in operation, as in the present embodiment.

If the failure of the semiconductor switches in the sub-inverter 30 is not an open-circuit failure of any of the semiconductor switches, but a short-circuit failure in which some of the semiconductor switches fall into a short-circuit state, it is also possible to operate the sub-inverter 30 in the through mode using the semiconductor devices that are short-circuited. However, the short-circuit failure causes an operation in an unpredictable mode, so that the operation depending on the short-circuit failure should be avoided. However, if it is essential to continue the operation without stopping, as in the case of an aircraft, the short-circuit failure may be used for the operation.

Embodiment 5

The present embodiment relates to an aircraft 100 having the power conversion device 1 according to Embodiments 1 to 4 installed on board. The aircraft 100 of the present embodiment is, for example, an airplane, a helicopter, a drone, or a flying car.

Figure 18:
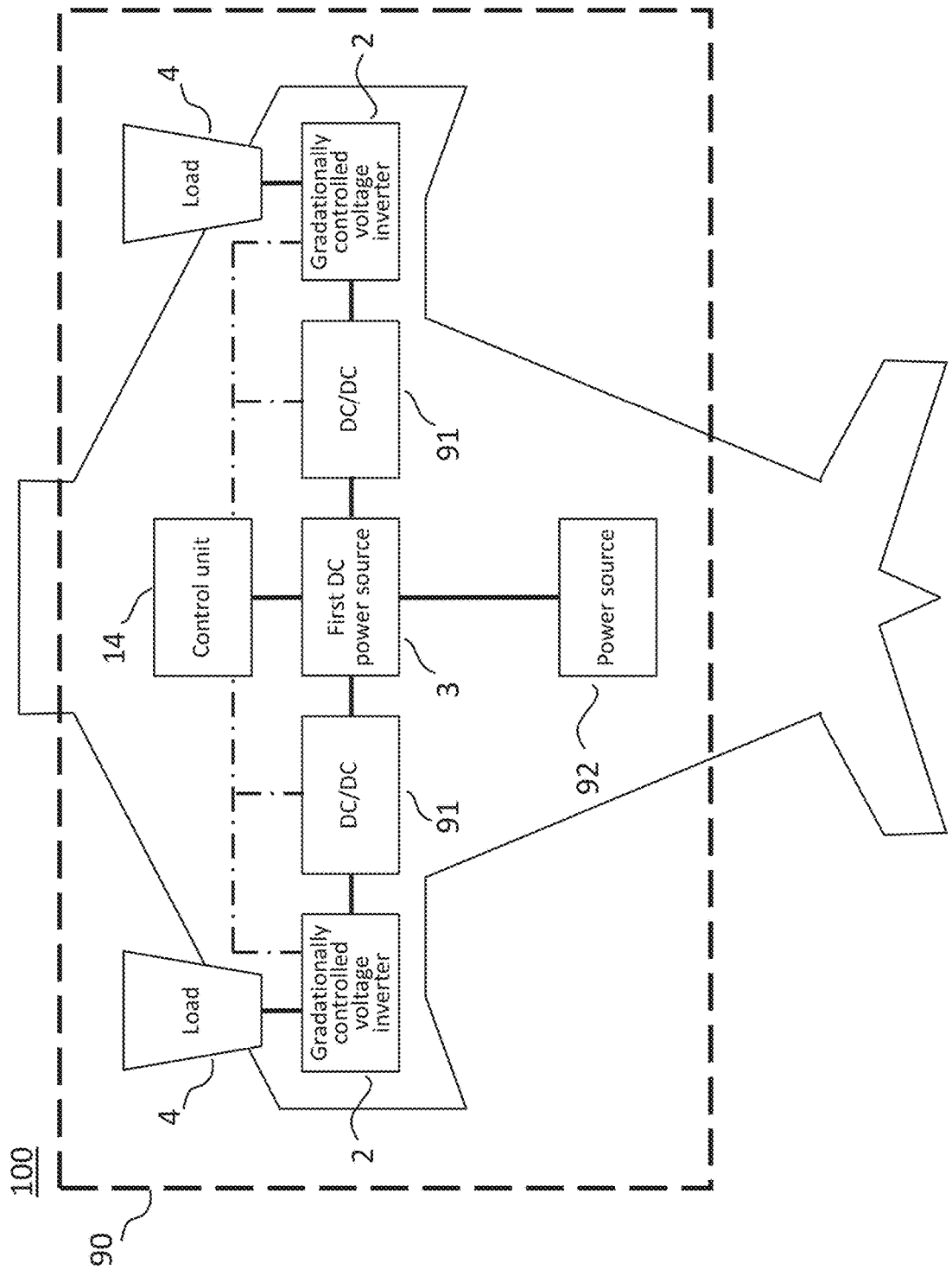
FIG. 18 is a schematic diagram of an aircraft according to Embodiment 5.

FIG. 18 is a schematic diagram of the aircraft 100 according to Embodiment 5. The aircraft 100 includes the gradationally controlled voltage inverter 2, which is the power conversion device 1 according to Embodiments 1 to 4. The aircraft 100, which is an electric aircraft, includes, as its propulsion power system 90, a power source 92, a first DC power source 3 connected to the power source 92, a step-down, step-up, or step-up/step-down DC/DC converter 91 connected to the first DC power source 3 for converting the voltage to a predetermined voltage, the gradationally controlled voltage inverter 2, which is the power conversion device 1 for converting the DC power stepped down or stepped up by the DC/DC converter 91 to AC power, and the load 4 powered by the gradationally controlled voltage inverter 2. The control unit 14 controls the DC/DC converter 91 and the gradationally controlled voltage inverter 2. The control unit 14 may be provided inside the gradationally controlled voltage inverter 2, or may be provided in a device separate from the gradationally controlled voltage inverter 2. The load 4 is a propulsion load, for example, an electric motor, for obtaining propulsion.

The power conversion device 1 in Embodiments 1 to 4 is used as the gradationally controlled voltage inverter 2 for an electric aircraft of the propulsion power system 90 provided on the aircraft 100. The power conversion device 1 in Embodiments 1 to 4 can reduce the noise caused by the main inverter 20 as described above. The power conversion device 1 in Embodiments 1 to 4 does not require the initial charging circuit for the capacitors 35 of the sub-inverter 30, as described above, and can reduce the size and weight of the cooler and the noise filter by its multilevel voltage output capability. Therefore, by installing the power conversion device 1 on the propulsion power system 90 of the aircraft 100, it is possible to achieve lower noise, smaller size, and lighter weight of the gradationally controlled voltage inverter 2 for an electric aircraft. This contributes to the fuel efficiency of the aircraft 100.

Embodiment 6

The present embodiment relates to an aircraft 100 having the power conversion device 1 according to Embodiments 1 to 4 installed on board. The aircraft 100 is, for example, an airplane, a helicopter, a drone, or a flying car.

Figure 19:
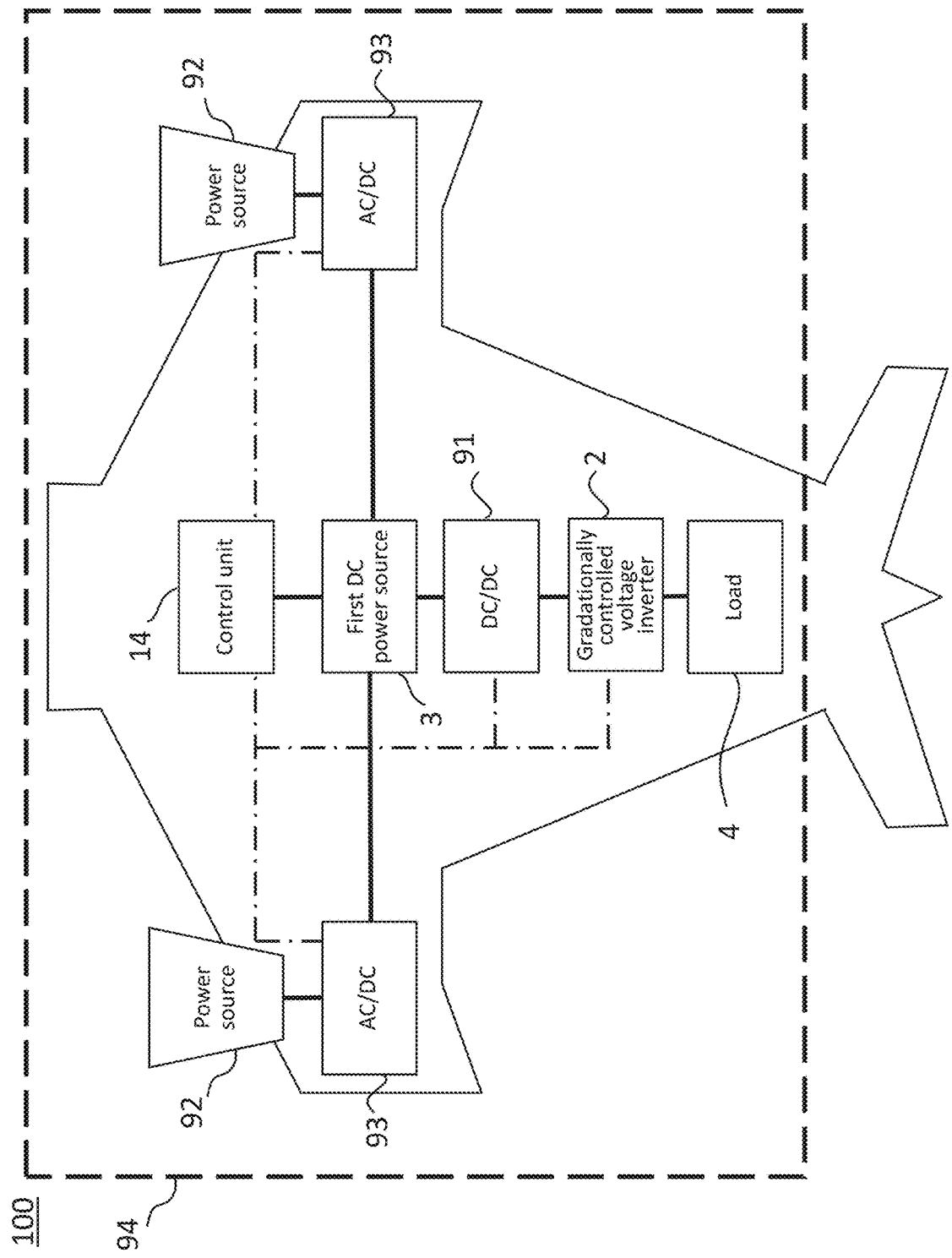
FIG. 19 is a schematic diagram of an aircraft according to Embodiment 6.

FIG. 19 is a schematic diagram of the aircraft 100 according to Embodiment 6. The aircraft 100 includes the gradationally controlled voltage inverter 2, which is the power conversion device 1 according to Embodiments 1 to 4. The aircraft 100, which is an electric aircraft, includes, as its equipment power system 94, the power source 92, an AC/DC converter 93 connected to the power source 92 for converting the AC power to DC power, the first DC power source 3 connected to the AC/DC converter 93, the step-down, step-up, or step-up/step-down DC/DC converter 91 connected to the first DC power source 3 for converting the voltage to a predetermined voltage, the gradationally controlled voltage inverter 2, which is the power conversion device 1 for converting the DC power stepped down by the DC/DC converter 91 to AC power, and the load 4 powered by the gradationally controlled voltage inverter 2. The control unit 14 controls the DC/DC converter 91, the gradationally controlled voltage inverter 2, and the AC/DC converter 93. The control unit 14 may be provided inside the gradationally controlled voltage inverter 2, or may be provided in a device separate from the gradationally controlled voltage inverter 2. The load 4 is an equipment load, such as an electric motor used for driving an air conditioner, an engine starter, and an auxiliary power device.

The aircraft 100 in the present embodiment uses the power conversion device 1 in Embodiments 1 to 4 as the gradationally controlled voltage inverter 2 for an electric aircraft in the equipment power system 94 installed in the aircraft 100. Therefore, it is possible to achieve lower noise, smaller size, and lighter weight of the gradationally controlled voltage inverter 2 for an electric aircraft, as in Embodiment 5. This contributes to the fuel efficiency of the aircraft 100.

Although not shown in the figures, the aircraft 100 may be equipped with a power storage battery. If the aircraft 100 is operated solely on the power storage battery instead of fuel, the reduced size and weight of the inverter contribute to improved electrical efficiency.

Although a variety of exemplary embodiments and examples are described in the present disclosure, the various features, modes, and functions described in one or more embodiments are not limited to application to a particular embodiment, but are applicable to each embodiment alone or in various combinations. Thus, countless variations not illustrated herein are conceivable within the scope of the technologies disclosed in the specification of the present application. Such variations include, for example, altering, adding, or omitting at least one configuration element, as well as extracting at least one configuration element and combining it with a configuration element of another embodiment.

DESCRIPTION OF SYMBOLS

1 . . . power conversion device,
2 . . . gradationally controlled voltage inverter,
3 . . . first DC power source,
4 . . . load,
10 . . . input noise filter,
11, 12 . . . two series capacitors,
13 . . . output noise filter,
14 . . . control unit,
20 . . . main inverter,
21 . . . U-phase main inverter arm,
22 . . . V-phase main inverter arm,
23 . . . W-phase main inverter arm,
24 . . . gate drive circuit,
30 . . . sub-inverter,
31 . . . U-phase sub-inverter,
32 . . . V-phase sub-inverter,
33 . . . W-phase sub-inverter,
34 . . . gate drive circuit,
35 . . . capacitor,
41, 42, 43, 44 . . . transistor,
45, 46, 47, 48 . . . impedance component,
50 signal generation unit,
51 . . . insulation unit,
52 . . . switching speed selecting unit,
61 . . . second DC power source,
62 . . . third DC power source,
90 . . . propulsion power system,
91 . . . DC/DC converter,
92 . . . power source,
93 . . . AC/DC converter,
94 . . . equipment power system,
100 . . . aircraft

The invention claimed is:
1. A power conversion device comprising:
a main inverter connected to a power source side, the main inverter having a gate drive circuit configured to change a gate impedance thereof;
a sub-inverter connected in series to the main inverter on a load side, the sub-inverter having a capacitor;
a voltage detector to detect a capacitor voltage of the sub-inverter;
a controlling circuitry to control the capacitor voltage of the sub-inverter detected by the voltage detector at a predetermined voltage, and to control the gate impedance of the main inverter before the capacitor voltage of the sub-inverter is controlled at the predetermined voltage so as to be larger than the gate impedance of the main inverter after the capacitor voltage of the sub-inverter is controlled at the predetermined voltage,
wherein the controlling circuitry increases the gate impedance of the main inverter during a start-up phase of the power conversion device when the capacitor voltage of the sub-inverter is below the predetermined voltage, and decreases the gate impedance of the main inverter after the capacitor voltage of the sub-inverter reaches the predetermined voltage.

2. The power conversion device according to claim 1, wherein the sub-inverter comprises a gate drive circuit configured to change a gate impedance thereof, and
wherein the controlling circuitry controls the gate impedance of the sub-inverter before the capacitor voltage of the sub-inverter is controlled at the predetermined voltage so as to be larger than the gate impedance of the sub-inverter after the capacitor voltage of the sub-inverter is controlled at the predetermined voltage.

3. The power conversion device according to claim 1, wherein the gate impedance of the main inverter is controlled in a predetermined time period after the capacitor voltage of the sub-inverter is controlled at the predetermined voltage, and
wherein the predetermined time period is a period of time during which an output voltage is held at a zero voltage point where the main inverter does not switch, or a period of time when the operation of the main inverter is switched between a pulse width modulation (PWM) mode and a single pulse mode.

4. The power conversion device according to claim 2, wherein the gate impedance of the sub-inverter is controlled in a predetermined time period after the capacitor voltage of the sub-inverter is controlled at the predetermined voltage, and
wherein the predetermined time period is a period of time during which an output voltage is held at a zero voltage point where the main inverter does not switch, or a period of time when the operation of the main inverter is switched between a pulse width modulation (PWM) mode and a single pulse mode.

5. The power conversion device according to claim 1, wherein the sub-inverter comprises a detector to detect failure of a semiconductor switch in the sub-inverter, and
wherein, when a failure occurs in the semiconductor switch of the sub-inverter after the gate impedance of the main inverter is controlled, the controlling circuitry causes the sub-inverter to operate in a through mode in which the output voltage of the main inverter is directly outputted to the load, and increases the gate impedance of the gate drive circuit for the main inverter to be higher than that before the failure of the semiconductor switch occurs.

6. The power conversion device according to claim 1, wherein, before the gate impedance of the main inverter is controlled, the controlling circuitry controls the sub-inverter in such a way that its output voltage is a zero voltage at switching timings to a rise and to a fall of the output voltage of the main inverter.

7. The power conversion device according to claim 1, wherein the main inverter is single-phase or multi-phase in its output.

8. The power conversion device according to claim 1, wherein the main inverter is a multi-level inverter.

9. An aircraft comprising:
a power source;
a load of a propulsion system to obtain propulsion or an equipment system; and
the power conversion device according to claim 1 connected to the power source and the load.

10. A power conversion method using a main inverter connected to a power source side, the main inverter having a gate drive circuit configured to change a gate impedance thereof, and a sub-inverter connected in series to the main inverter on a load side, the sub-inverter having a capacitor, the power conversion method comprising:
detecting a capacitor voltage of the sub-inverter; and
controlling the detected capacitor voltage of the sub-inverter at a predetermined voltage, and controlling the gate impedance of the main inverter before the capacitor voltage of the sub-inverter is controlled at the predetermined voltage so as to be larger than the gate impedance of the main inverter after the capacitor voltage of the sub-inverter is controlled at the predetermined voltage,
wherein the gate impedance of the main inverter is controlled to increase during a start-up phase of the power conversion device when the capacitor voltage of the sub-inverter is below the predetermined voltage, and the gate impedance of the main inverter is controlled to decrease after the capacitor voltage of the sub-inverter reaches the predetermined voltage.

11. The power conversion device according to claim 2, wherein the gate impedance of the main inverter is controlled in a predetermined time period after the capacitor voltage of the sub-inverter is controlled at the predetermined voltage, and
wherein the predetermined time period is a period of time during which an output voltage is held at a zero voltage point where the main inverter does not switch, or a period of time when the operation of the main inverter is switched between a pulse width modulation (PWM) mode and a single pulse mode.

12. The power conversion method according to claim 3, wherein the gate impedance of the sub-inverter is controlled in a predetermined time period after the capacitor voltage of the sub-inverter is controlled at the predetermined voltage, and
wherein the predetermined time period is a period of time during which the output voltage is held at a zero voltage point where the main inverter does not switch, or a period of time when the operation of the main inverter is switched between a pulse width modulation (PWM) mode and a single pulse mode.

13. The power conversion device according to claim 11, wherein the gate impedance of the sub-inverter is controlled in a predetermined time period after the capacitor voltage of the sub-inverter is controlled at the predetermined voltage, and
wherein the predetermined time period is a period of time during which the output voltage is held at a zero voltage point where the main inverter does not switch, or a period of time when the operation of the main inverter is switched between a pulse width modulation (PWM) mode and a single pulse mode.

* * * * *